(12) United States Patent
Owara et al.

(10) Patent No.: US 7,966,293 B1
(45) Date of Patent: Jun. 21, 2011

(54) SYSTEM AND METHOD FOR INDEXING A BACKUP USING PERSISTENT CONSISTENCY POINT IMAGES

(75) Inventors: Shane S. Owara, Sunnyvale, CA (US); Sahn Lam, Daly City, CA (US)

(73) Assignee: NetApp, Inc., Sunnyvale, CA (US)

( * ) Notice: Subject to any disclaimer, the term of this patent is extended or adjusted under 35 U.S.C. 154(b) by 1090 days.

(21) Appl. No.: 10/796,249

(22) Filed: Mar. 9, 2004

(51) Int. Cl.
*G06F 7/00* (2006.01)
*G06F 17/00* (2006.01)

(52) U.S. Cl. .................. 707/654; 707/674; 707/956

(58) Field of Classification Search .................. 707/200, 707/204, 999.2–999.204, 654, 674, 956
See application file for complete search history.

(56) References Cited

U.S. PATENT DOCUMENTS

| | | |
|---|---|---|
| 4,570,217 A | 2/1986 | Allen et al. |
| 5,163,131 A | 11/1992 | Row et al. |
| 5,202,979 A | 4/1993 | Hillis et al. |
| 5,278,979 A | 1/1994 | Foster et al. |
| 5,355,453 A | 10/1994 | Row et al. |
| 5,485,579 A | 1/1996 | Hitz et al. |
| 5,511,177 A | 4/1996 | Kagimasa et al. |
| 5,802,366 A | 9/1998 | Row et al. |
| 5,819,292 A | 10/1998 | Hitz et al. |
| 5,897,661 A | 4/1999 | Baranovsky et al. |
| 5,931,918 A | 8/1999 | Row et al. |
| 5,941,972 A | 8/1999 | Hoese et al. |
| 5,948,110 A | 9/1999 | Hitz et al. |
| 5,963,962 A | 10/1999 | Hitz et al. |
| 6,038,570 A | 3/2000 | Hitz et al. |
| 6,065,037 A | 5/2000 | Hitz et al. |
| 6,119,244 A | 9/2000 | Schoenthal et al. |
| 6,138,126 A | 10/2000 | Hitz et al. |
| 6,185,655 B1 | 2/2001 | Peping |
| 6,425,035 B2 | 7/2002 | Hoese et al. |
| 6,434,681 B1 * | 8/2002 | Armangau ..................... 711/162 |
| 6,574,591 B1 | 6/2003 | Kleiman et al. |

(Continued)

FOREIGN PATENT DOCUMENTS

WO WO 2004/015521 A3 2/2004

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

(Continued)

*Primary Examiner* — Kimberly Lovel
(74) *Attorney, Agent, or Firm* — Cesari and McKenna, LLP

(57) ABSTRACT

This invention provides a system and method for managing backup and restore operations on a storage system, typically between source storage system and destination storage system using a backup management client that employs a version of the Network Data Management Protocol to interface with the destination file server and generate an "index" of data structures (such as directories and files) from directly from scanning the trees of PCPIs stored on the destination. The management client includes a command line interface for entry of instructions by a user or application and a web-based user interface and allows the index to be displayed as a series of web pages on a graphical user interface. The index can be browsed and selected data structures can be restored to a source filer/file server as desired. All back-ups/PCPIs can be contemporaneously browsed, allowing greater flexibility in selecting a best backup image to restore.

37 Claims, 19 Drawing Sheets

U.S. PATENT DOCUMENTS

| | | | |
|---|---|---|---|
| 6,606,690 | B2 | 8/2003 | Padovano |
| 7,383,463 | B2 * | 6/2008 | Hayden et al. ............... 714/4 |
| 2001/0001877 | A1 * | 5/2001 | French et al. ............ 713/182 |
| 2001/0044807 | A1 | 11/2001 | Kleiman et al. |
| 2002/0083037 | A1 | 6/2002 | Lewis et al. |
| 2002/0112022 | A1 | 8/2002 | Kazar et al. |
| 2002/0116593 | A1 | 8/2002 | Kazar et al. |
| 2002/0175938 | A1 | 11/2002 | Hackworth |
| 2003/0066062 | A1 * | 4/2003 | Brannock et al. ........... 717/169 |
| 2003/0105889 | A1 * | 6/2003 | Shi et al. ................. 709/331 |
| 2003/0131207 | A1 * | 7/2003 | Arakawa et al. ............ 711/162 |
| 2003/0167380 | A1 * | 9/2003 | Green et al. ............... 711/136 |
| 2003/0182312 | A1 | 9/2003 | Chen et al. |
| 2003/0182313 | A1 | 9/2003 | Federwisch et al. |
| 2003/0182322 | A1 | 9/2003 | Manley et al. |
| 2003/0182325 | A1 | 9/2003 | Manley et al. |
| 2003/0182330 | A1 | 9/2003 | Manley et al. |
| 2004/0010487 | A1 * | 1/2004 | Prahlad et al. ................. 707/1 |
| 2004/0022278 | A1 * | 2/2004 | Thomas et al. ............ 370/537 |
| 2004/0030822 | A1 | 2/2004 | Rajan et al. |
| 2004/0250033 | A1 * | 12/2004 | Prahlad et al. ............ 711/162 |
| 2005/0192974 | A1 * | 9/2005 | DeLorme et al. ........... 707/100 |
| 2005/0193026 | A1 * | 9/2005 | Prahlad et al. ............ 707/200 |
| 2005/0216788 | A1 * | 9/2005 | Mani-Meitav et al. ......... 714/6 |
| 2007/0185940 | A1 * | 8/2007 | Prahlad et al. ............ 707/204 |
| 2007/0250663 | A1 * | 10/2007 | Welsh et al. ............... 711/117 |

OTHER PUBLICATIONS

Bitton, Dina, *Disk Shadowing*, Proceedings of the 14*th* VLDB Conference, LA, CA 1988.

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R, AFS-3 Programmer's Reference: Architectural Overview, Transarc Corporation, Pittsburgh, PA, 1.0 edition 1991.

U.S. Appl. No. 10/126,822, Federwisch et al.

U.S. Appl. No. 10/777,978, Stephen L. Manley.

"Network Appliance Ends NAS/SAN War" by Computerwire, http://www.theregister.co.uk/content/63/27368.html; posted on Feb. 10, 2002.

Callaghan B. "NFS Version 3 Protocol Specification", Request for Comments (RFC) 1813 Jun. 1995.

Lu, Y. "Performance Study of iSCSI-Based Storage Subsystems", IEEE Communications Magazine, pp. 76-82, Aug. 2003.

Celerra File Server Architecture for High Availability, EMC2 where information lives, Aug. 1999, pp. 1-7.

International Search Report for International Application No. PCT/US03/23661 filed on Jul. 28, 2003, three pages, International Search Report mailed Mar. 9, 2004.

Maintenance Procedures ND (8C) nd-network disk control Feb. 1985.

Misc. Reference Manual Pages ND (4P) nd-network disk driver Jul. 26, 1985.

Asante EN/SC Adapter Family Installation Guide May 1994.

Asante Desktop EN/SC Adapters User's Manual Apr. 1996.

Performance Without Compromise: The Virtual Storage Architecture 1997.

David Ritz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

Stager et al., Network Data Management Protocol, Network Working Group Internet Draft Version 1.7.3, Oct. 24, 1996.

* cited by examiner

Browse Backups

Primary Directory

| | |
|---|---|
| Primary Directory | filer1:/vol1/qt3 |
| Secondary Volume | bigdog1:/backups |

| Backup Name ▼ | Backup Time | Restore |
|---|---|---|
| dfm_sv_hourly.0 | 19 Sep 12:00 | restore |
| dfm_sv_hourly.1 | 19 Sep 10:00 | restore |
| dfm_sv_hourly.2 | 19 Sep 06:00 | restore |
| dfm_sv_daily.0 | 19 Sep 02:00 | restore |
| dfm_sv_hourly.3 | 18 Sep 22:00 | restore |

FIG. 13

Secondary Storage Systems

Add a New Secondary Storage System

Secondary System Name [ ]

NDMP User Name [ ]

NDMP Password [ ]

[ Add ]

Name: [ ]

| Secondary System ▼ | Secondary Volumes | Edit |
|---|---|---|
| bigdog | bigdog:/vol0<br>bigdog:/vol1<br>bigdog:/vol3 ... | edit |
| bigdog2 | bigdog2:/vol0 | edit |
| bigdog3 | bigdog3:/vol0<br>bigdog3:/sec1 | edit |

Edit Secondary Storage System
Secondary Storage System

- Secondary System Name: bigdog
- NDMP User Name: root
- NDMP Password: ******

Update 1500
1510
1520
1530

FIG. 16

Secondary Volumes
Add a New Secondary Volume

Secondary System: bigdog1

Secondary Volume
example: /backups

Update

Name: bigdog    View: All Secondary Volumes

| Secondary Volume | Backup Schedule | Status | Primaries | Browse Backups | Edit |
|---|---|---|---|---|---|
| bigdog:/vol1 | Remote Data Servers | OK | filer1:/vol1/qt3 filer2:/vol1/qt4 | browse | edit |
| bigdog:/vol2 | Core Directories | OK | filer:/cores/cores | browse | edit |
| bigdog:/backups | Remote Data Servers | OK | filer2:/vol1/qt5 filer3:/vol1/qt6 More... | browse | edit |

1600
1610
1620
1640
1650
1660
1670
1680
1690
1630

SYSTEM AND METHOD FOR INDEXING A BACKUP USING PERSISTENT CONSISTENCY POINT IMAGES

FIELD OF THE INVENTION

The present invention relates to data storage systems and, in particular, to data backup operations and browsing of backups.

BACKGROUND OF THE INVENTION

A. Storage Systems

A storage appliance is a computer that provides file service relating to the organization of information on storage devices, such as disks. The file server (or filer) includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The to references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a computer that manages data access and may, in the case of a storage appliance, implement file system semantics, such as the Data ONTAP™ storage operating system that is implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

B. Remote Replication

In order to improve reliability and facilitate disaster recovery in the event of a failure of a filer, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or it's infrastructure (e.g. a flood, power outage, act of war, etc.). The mirror is updated at regular intervals, typically set by an administrator, in an effort to catch the most recent changes to the file system. One common form of update involves the use of a Snapshot™ process.

Snapshotting is further described in TR3002 *File System Design for an NFS File Server Appliance* by David Hitz et al., published by Network Appliance, Inc., and in U.S. Pat. No. 5,819,292 METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference. The term "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a'name or other unique identifier that distinguishes it from other PCPIs taken at other points in time. A PCPI can also include other information (metadata) about the active file system at the particular point in time for which the image is taken. Note that the terms "PCPI" and "Snapshot™" may be used interchangeably throughout this patent without derogation of Network Appliance's trademark rights.

By way of background, a snapshot or PCPI is a restorable version of a file system created at a predetermined point in time. PCPIs are generally created on some regular schedule. The PCPI is stored on-disk along with the active file system, and is called into the buffer cache of the storage appliance memory as requested by the storage operating system. An exemplary file system data identifier buffer tree structure (using inodes in this example—but other forms of block and data identifiers can be employed) 100 is shown in FIG. 1. Over the exemplary tree structure may reside a file system information block (not shown). The root inode 105 contains information describing the inode file associated with a given file system. In this exemplary file system inode structure root inode 105 contains a pointer to the inode file indirect block 110. The inode file indirect block 110 contains a set of pointers to inode file and data blocks 115. The inode file data block 115 includes pointers to file and data blocks to 120A, 120B and 120C. Each of the file data blocks 120(A-C) is capable of storing, in the illustrative embodiment, 4 kilobytes (KB) of data. Note that this structure 100 is simplified, and that additional layers of data identifiers can be provided in the buffer tree between the data blocks and the root inode as appropriate.

When the file system generates a PCPI of a given file system, a PCPI inode 205 is generated as shown in FIG. 2. The PCPI inode 205 is, in essence, a duplicate copy of the root inode 105 of the data structure (file system) 100. Thus, the exemplary structure 200 includes the same inode file indirect block 110, inode file data block(s) 115 and file data blocks 120A-C as in FIG. 1. When a user modifies a file data block, the file system layer writes the new data block to disk and changes the active file system to point to the newly created block.

FIG. 3 shows an exemplary data structure 300 after a file data block has been modified. In this illustrative example, file data block 120C was modified to file data block 120C'. When file data block 120C is modified file data block 120C', the contents of the modified file data block are written to a new location on disk as a function for the exemplary file system. Because of this new location, the inode file data block 315 pointing to the revised file data block 120C must be modified to reflect the new location of the file data block 120C. Similarly, the inode file indirect block 310 must be rewritten to point to the newly revised inode file and data block. Thus, after a file data block has been modified the PCPI inode 205 contains a point to the original inode file system indirect block 110 which in turn contains a link to the inode file data block 115. This inode file data block 115 contains pointers to the original file data blocks 120A, 120B and 120C. However, the newly written inode file data block 315 includes pointers to unmodified file data blocks 120A and 120B. The inode file data block 315 also contains a pointer to the modified file data block 120C' representing the new arrangement of the active file system. A new file system root inode 305 is established representing the new structure 300. Note that metadata (not shown) stored in any Snapshotted blocks (e.g., 205, 110, and 120C) protects these blocks from being recycled or overwritten until they are released from all PCPIs. Thus, while the active file system root inode 305 points to new blocks 310, 315 and 120C', the old blocks 205, 110, 115 and 120C are retained until the PCPI is fully released.

After a PCPI has been created and file data blocks modified, the file system layer can reconstruct or traverse (or otherwise gain access to) the file system inode structure as it existed at the time of the snapshot by accessing the PCPI inode. By following the pointers contained in the PCPI inode 205 through the inode file indirect block 110 and inode file data block 115 to the unmodified file data blocks 120A-C, the file system layer can reconstruct the file system as it existed at the time of creation of the snapshot.

Generally, a PCPI is an image (typically read-only) of a file system at a point in time, which is stored on the same primary storage device as is the active file system and is accessible by users of the active file system. Note, that by "active file system" it is meant the file system to which current input/output (I/O) operations are being directed. Each time a PCPI occurs, the old active file system becomes the new PCPI, and the new active file system carries on, recording any new changes. A set number of PCPIs may be retained depending upon various time-based and other criteria. The PCPI process is described in further detail in U.S. patent application Ser. No. 09/932,578, entitled INSTANT SNAPSHOT by Blake Lewis et al., now issued as U.S. Pat. No. 7,454,445 on Nov. 18, 2008, which is hereby incorporated by reference as though fully set forth herein In "replication" of a file system to a destination (or secondary) backing store, above-described PCPIs are copied over a network (such as the well-known Internet) from a source (or primary) system to the remote (or otherwise discrete) storage site. Note that, as used herein, the term "primary" refers to a storage system on which data is being actively modified (e.g. through applications), while the term "secondary" refers to each storage system used to store backup copies of the primary's data.

The complete recopying of the entire file system to a remote (destination/secondary) site over a network may be quite inconvenient where the size of the file system is measured in tens or hundreds of gigabytes (even terabytes). This full-backup approach to remote data mirroring or replication may severely tax the bandwidth of the network and also the processing capabilities of both the destination and source filer. One solution has been to limit the replica to only portions of a file system volume that have experienced changes. Hence, FIG. 4 shows volume-based mirroring/replication procedure where a source file system 400 is connected to a destination storage site 402 (consisting of a server and attached storage—not shown) via a network link 404. The destination 402 receives periodic mirror/replica updates at some regular interval set by an administrator. These intervals are chosen based upon a variety of criteria including available bandwidth, importance of the data, frequency of changes and overall volume size.

In brief summary, the source creates a pair of discrete time-separated PCPIs of the to volume. These can be created as part of the commit process in which data is committed to non-volatile memory in the filer or by another mechanism. The "new" PCPI 410 is a recent PCPI of the volume's active file system. The "old" PCPI 412 is an older or "base" PCPI of the volume, which should match the image of the file system mirrored/replicated on the destination mirror. Note that the file server is free to continue work on new file service requests once the new PCPI 412 is made. The new or "incremental" PCPI acts as a checkpoint of activity up to that time rather than an absolute representation of the then-current volume state. A differencer 420 scans the blocks 422 in the old and new PCPIs. In particular, the differencer works in a block-by-block fashion, examining the list of blocks in each PCPI to compare which blocks have been allocated. In the case of a write-anywhere system, the block is not reused as long as a PCPI references it, thus a change in data is written to a new block. Where a change is identified (denoted by a presence or absence of an 'X' designating data), a decision process 400, shown in FIG. 5, in the differencer 420 decides whether to transmit the data to the destination 402. The decision process 500 compares the old and new blocks as follows: (a) where data is in neither an old nor new block (case 502) as in old/new block pair 430, no data is available to transfer; (b) where data is in the old block, but not the new (case 504) as in old/new block pair 432, such data has already been transferred and deleted on the source so there is no need to transmit it—rather any deletes are implicitly sent with the changed block information; (c) where data is present in the both the old block and the new block (case 506) as in the old/new block pair 434, no change has occurred and the block data has already been transferred in a previous PCPI; and (d) finally, where the data is not in the old block, but is in the new block (case 508) as in old/new block pair 436, then a changed data block is transferred over the network to become part of the changed volume mirror/replica set 440 at the destination as a changed block 442. In the exemplary write-anywhere arrangement, the changed blocks are written to new, unused locations in the storage array. Once all changed blocks are written, a base file system information block, that is the root pointer of the new PCPI, is then committed to the destination. The transmitted file system information block is committed, and updates the overall destination file system by pointing to the changed block structure in the destination, and replacing the previous file system information block. The changes are at this point committed as the latest incremental update of the destination volume mirror. This file system accurately represents the "new" mirror on the source. In time a new "new" mirror is created from further incremental changes.

Approaches to volume-based remote mirroring of PCPIs are described in detail in commonly owned U.S. patent application Ser. No. 09/127,497, entitled FILE SYSTEM IMAGE TRANSFER by Steven Kleiman, et al., now issued as U.S. Pat. No. 6,604,118 on Aug. 5, 2003, and U.S. patent application Ser. No. 09/426,409, entitled FILE SYSTEM IMAGE TRANSFER BETWEEN DISSIMILAR FILE SYSTEMS by Steven Kleiman, et al., now issued as U.S. Pat. No. 6,574,591 on Jun. 3, 2003, both of which are expressly incorporated herein by reference.

In some circumstances it may be desirable to replicate less than an entire volume structure. The volume-based approach typically forces an entire volume to be scanned for changes and those changes to be transmitted on a block-by-block basis. In other words, the scan focuses on blocks without regard to any underlying information about the files, inodes and data structures, which the blocks comprise. The destination is organized as a set of volumes so a direct volume-by-volume mapping is established between source and destination. Where a volume may contain a terabyte or more of information, the block-by-block approach to scanning and comparing changes may still involve significant processor overhead and associated processing time. Often, there may have been only minor changes in a sub-block beneath the root inode block being scanned. Since a list of all blocks in the volume is being examined, however, the fact that many groupings of blocks (files, inode structures, etc.) are unchanged is not considered. In addition, the increasingly large size and scope of a full volume make it highly desirable to sub-divide the data being mirrored into sub-groups (for example, qtrees, which are described further below) because some groups are more likely to undergo frequent changes, it may be desirable to update their associated images on the backing store more often than other, less-frequently changed groups. In addition, it may be desirable to mingle original and imaged (Snap-shotted) sub-groups in a single volume and migrate certain key data to remote locations without migrating an entire volume.

One such sub-organization of a volume is the well-known qtree. Qtrees, as implemented on an exemplary storage system such as described herein, are subtrees in a volume's file system. One key feature of qtrees is that, given a particular qtree, any file or directory in the system can be quickly tested for membership in that qtree, so they serve as a good way to organize the file system into discrete data sets. The use of qtrees as a source and destination for replicated data may be desirable. An approach to remote asynchronous mirroring of a qtree is described in U.S. patent application Ser. No. 10/100,967 entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., now issued as U.S. Pat. No. 6,993,539 on Jan. 31, 2006, the teachings of which are incorporated herein by reference.

C. Backup Considerations

The use of magnetic tape to store a sequential backup of a data (files, directories, etc.) from a storage system has been popular for many decades. A typical tape backup data is stored on tape media in association with a "backup index." This index points to the location on the tape or another image structure where the particular directory, file, etc. resides. The index allows the user to ascertain the nature of the data stored and to retrieve it when needed for restoration to the storage system (for, example to an active in-core or on-disk file structure). Certain backup applications present aggregated lists across several incremental backups (each increment typically backing up a time-based and/or changed-file chunk of data.

The index traditionally takes the form a table of contents of the various files and directories stored as backups serially on the tape or other media. It is often written directly to the tape as a header (before the backup data) in an appropriate location so that it can be read back to the system at any time. This header may also contain physical tape locations cross referenced to certain backup files for easy location of the data on the tape. This index information (including physical tape locations) may also be located in an on-disk file that is managed by the backup application.

When a tape backup receives an incremental backup (e.g. only certain data, typically containing current changes to files and directories), the data is not a complete picture of the file system. To effectively browse and restore such data, the backup application must first coalesce all relevant incremental backups into a single image and backup indices into an overall table of contents to create the full image of the file system. This requires time and resources.

Where a destination backing store (storage system or filer) receives incremental PCPIs of data, it stores the PCPIs as discrete, identifiable versions of the data with key information (file name and creation time) stored directly in the file system directory tree where it can be easily traversed by the file system, and readily provides the user with a full image of the file system or other data structure (e.g. a qtree) at a certain point in time. Hence, it is desirable to provide a mechanism for indexing data directly from such PCPI data structures on the destination.

SUMMARY OF THE INVENTION

This invention overcomes the disadvantages of the prior art by providing a system and method for managing backup and restore operations on a storage system, typically between source (or "primary") storage system and destination (or "secondary") storage system using a backup management client that employs a version of the Network Data Management Protocol (NDMP) to interface with the destination file server and generate an "index" of data structures (such as directories and files) from directly from scanning the trees of PCPIs ("Snapshots™") stored on the destination. The management client includes a command line interface for entry of instructions by a user or application and a web-based user interface and allows the index to be displayed as a series of web pages (HTML-based) on a graphical user interface. The index can be browsed and selected data structures can be restored to a source filer/file server as desired. All backups/PCPIs can be contemporaneously browsed, allowing greater flexibility in selecting a best backup image to restore. Within a given backup, the relative contents can be browsed, providing further assurance to an administrator that the correct/desired versions of particular data sets (files) within the browsed backup are present. Likewise, the creation of PCPIs for use as backups can be scheduled through the management client. In accordance with an advantageous of this invention coalescing of individual backups and indices into a resulting image and table of contents is unnecessary, as incremental backups may be accessed and browsed directly via their associated PCPIs on the backing store.

In accordance with this invention, the user may advantageously access any of a number of incremental backups via their associated PCPIs and browse these destination is backups at will and relatively concurrent with their creation. Restoration of such backups to the source from the destination is straightforward using then associated graphical user interface. Likewise, the user may access the source via NDMP and perform scheduled and unscheduled backups to the destination. The source may be browsed by scanning the associated directory trees. A plurality of source and/or destination storage systems (filers, etc.) can be arranged into a single grouping so that multiple source systems transmit backups to one or more destinations and/or destination volumes.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 13 is a diagram of a graphical user interface screen showing a listing of destination backups of a selected source directory source according to an embodiment of this invention;

FIG. 14 is a diagram of a graphical user interface screen for adding new destination storage systems according to an embodiment of this invention;

FIG. 15 is a diagram of a graphical user interface screen for editing parameters of destination storage systems according to an embodiment of this invention;

FIG. 16 is a diagram of a graphical user interface screen for adding new destination volumes according to an embodiment of this invention;

DETAILED DESCRIPTION OF AN ILLUSTRATIVE EMBODIMENT

A. Source and Destination Storage System Environment

Figure 1:
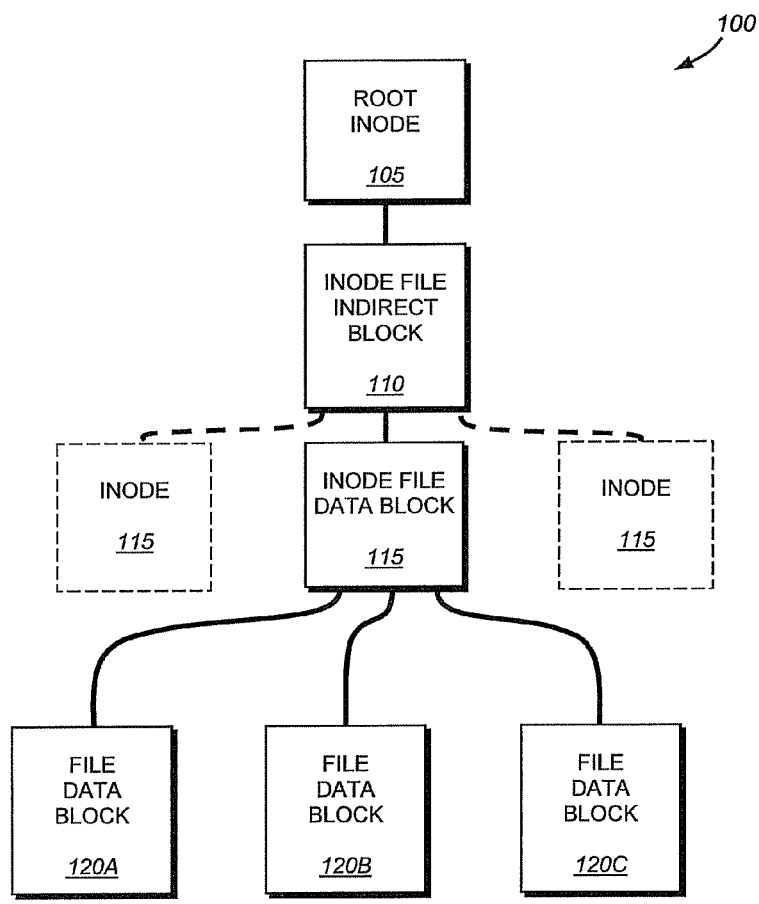
FIG. 1, already described, is schematic block diagram of an exemplary file system inode structure about to undergo a PCPI procedure according to the prior implementation.
Figure 2:
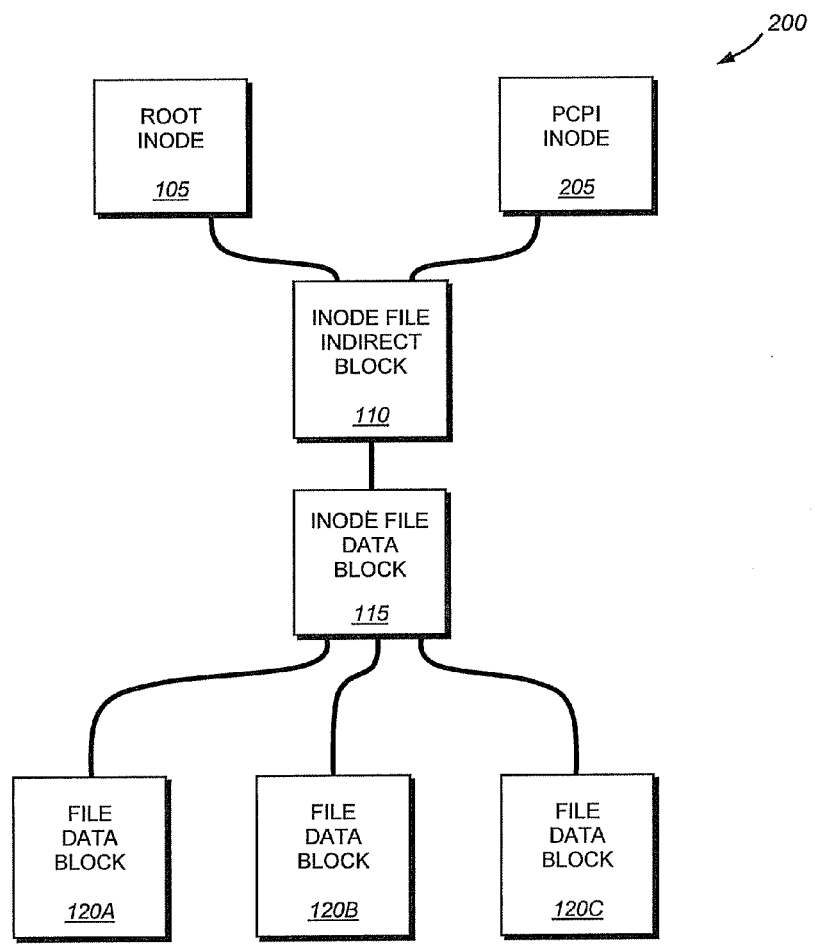
FIG. 2, already described, is a schematic block diagram of the exemplary file system inode structure of FIG. 1 including a PCPI inode, according to a prior implementation.
Figure 3:
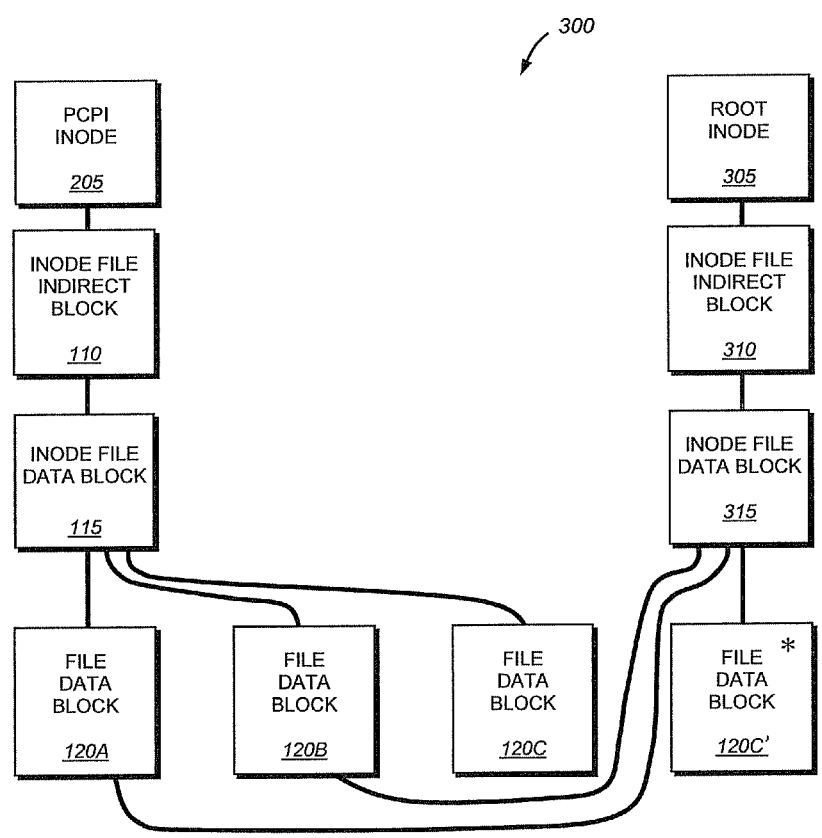
FIG. 3, already described, is a schematic block diagram of an exemplary file system inode structure of FIG. 1 after data block has been rewritten, according to a prior implementation.
Figure 4:
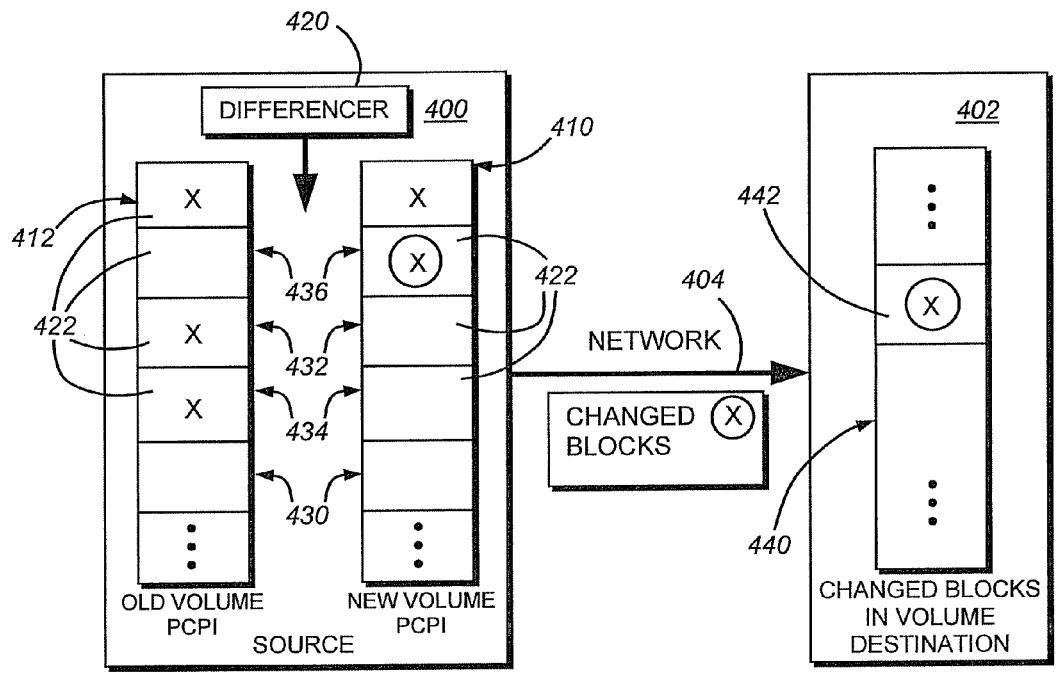
FIG. 4, already described, is a schematic block diagram of an exemplary remote mirroring of a volume file system from a source file server to a destination file server over a network according to a prior implementation.
Figure 5:
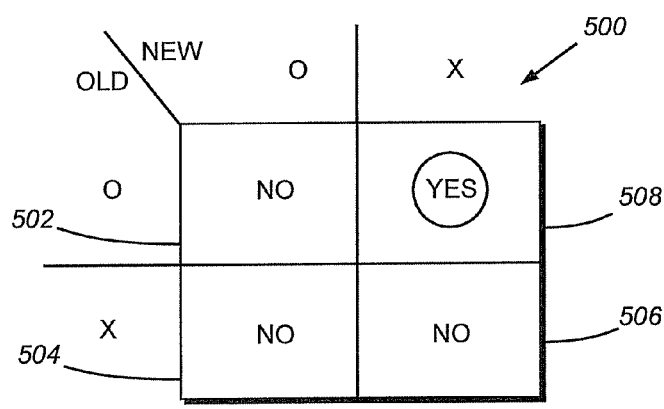
FIG. 5, already described, is a decision table used by a block differencer of FIG. 4 for determining whether a change in a block is to be transmitted from the source file server to the destination file server according to a prior implementation.
Figure 6:
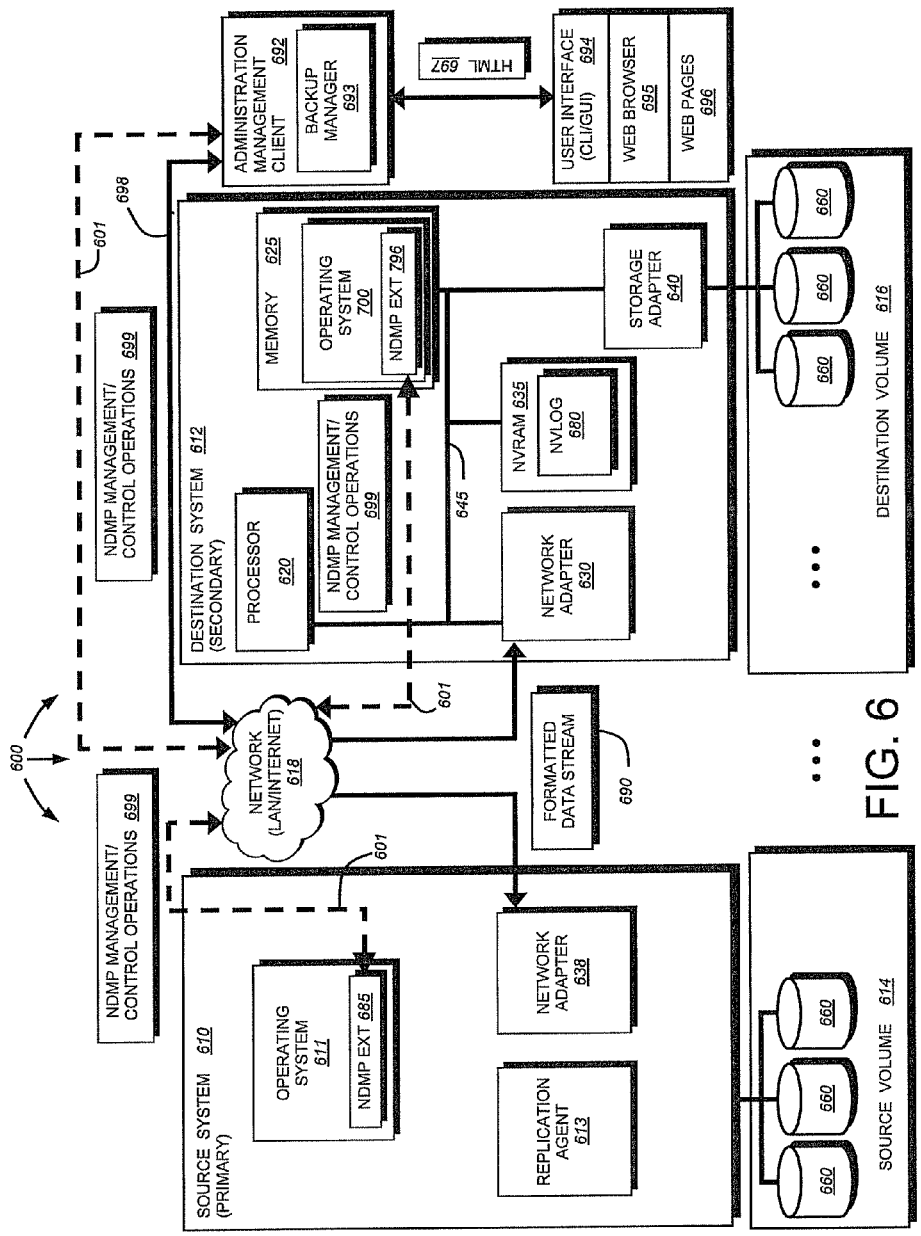
FIG. 6 is a schematic block diagram of an exemplary source storage system and destination storage system interconnected by a network and transmitting a formatted data is stream as well as a backup management client and associated user interface interconnect to the destination in accordance with an illustrative embodiment of this invention.

By way of further background, FIG. 6 is a schematic block diagram of a storage system environment 600 that includes a pair of interconnected storage systems (e.g. file servers, computers, networked storage devices) and the like including a source system 610 and a destination system 612 that may be advantageously used with the present invention. For the purposes of this description, the source system is a networked computer that manages file systems stored on storage one or more storage disks 660. The source system 610 executes an operating system 611. The operating system 611 may be a filer implementing the Data Ontap™ storage operating system as described above or alternatively another operating system such as the commercially available Sun Microsystems's Solaris®, Microsoft Windows® 2000, HP/UX or AIX. The operating system 611 implements an OS-specific file system (such as the above-described WAFL file system) on the disks 660 connected to the source system 610.

The destination system, in this example is a file server or filer 612 that manages one or more destination volumes 616, comprising arrays of disks 660. The source 610 and destination 612 are linked via a network 618 that can comprise a local or wide area network, such as the well-known Internet. An appropriate network adapter 636 and 630, residing the source and destination 610, and 612 respectively, facilitates communication over the network 618. Note, as used herein, the term "source" can be broadly defined as a location from which the subject data of this invention travels and the term "destination" can be defined as the location to which the data travels. While a source system and a destination filer, connected by a network, is a particular example of a source and destination used herein, a source and destination could be computers/filers linked via a direct link, or via loopback (a "networking" arrangement internal to a single computer for transmitting a data stream between local source and local destination), in which case the source and the destination may comprise the same filer. Likewise, the term's source and to destination as used herein can be alternatively referred to as the "primary" and "secondary" storage systems, file servers or filers as appropriate.

The destination filer 612 comprises a processor 620, a memory 625, a network adapter 630 and a storage adapter 640 interconnected by a system bus 645. The destination filer 612 also includes a storage operating system 700 (FIG. 7) that implements a file system to logically organize the information as a hierarchical structure of directories and files on the disks. As noted above, the source system 610 can also be described in connection to the storage operating system 700 in an illustrative embodiment.

It will be understood to those skilled in the art that the inventive technique described herein may apply to any type of special-purpose computer (e.g., file serving appliance) or general-purpose computer, including a standalone computer, embodied as a storage system. To that end, the destination filer 612 can be broadly, and alternatively, referred to as a "storage system." Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the destination memory 625 comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system 700, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 630 comprises the mechanical, electrical and signaling circuitry needed to connect the filer 612 to the network 618, which may comprise a point-to-point connection or a shared medium, such as a local area network. Moreover the source 610 may interact with the destination filer 612 in accordance with a client/server model of information delivery. That is, the client may request the services of the filer, and the filer may return the results of the services requested by the client, by exchanging packets encapsulating, e.g., the TCP/IP protocol or another network protocol format over the network 618.

The storage adapter 640 cooperates with the operating system 700 (FIG. 7) executing on the filer to access information requested by the client. The information may be stored on the disks 660 that are attached, via the storage adapter 640 to the filer 612 or other node of a storage system as defined herein. The storage adapter 640 includes input/output (I/O) interface circuitry that couples to the disks over an I/O interconnect arrangement, such as a conventional high-performance, Fibre Channel serial link topology.

Each system 610, 612 may also be interconnected with one or more clients (not shown) via the network adapters 638, 630, respectively. The clients transmit requests for file service to the destination filer 612 respectively, and receive responses to the requests over a LAN or other network (618). Data is transferred between the client and the filer 612 using data packets defined as an encapsulation of the Common Internet File System (CIFS) protocol or another appropriate protocol, such as NFS.

In one exemplary filer implementation, the destination filer 612 can include a nonvolatile random access memory (NVRAM) 635 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

In an illustrative embodiment, the disks 660 are arranged into a plurality of volumes (for example, source volumes 614 and destination volumes 616), in which each volume has a file system associated therewith. The volumes each include one or more disks 660. In one embodiment, the physical disks 660 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume. Information in the volumes may be organized as files, directories and virtual disks (vdisks). That is, to facilitate access to the disks, the destination storage operating system 700 implements a write-anywhere file system that logically organizes the information as a hierarchical structure of directory, file and vdisk objects (hereinafter "directories", "files" and "vdisks") on the disks. A vdisk is a special file type that is translated into an emulated disk or logical unit number (lun) as viewed by a storage are network (SAN) client, which may implement a block-based protocol for storage organization. Each "on-disk" file may be implemented as set of disk blocks configured to store information, such as data, whereas the directory may be implemented as a specially formatted file in which names and links to other files and directories are stored. Vdisks are further described in U.S. patent application Ser. No. 10/216,453, entitled STORAGE VIRTUALIZATION BY LAYERING VIRTUAL DISK OBJECTS ON A FILE SYSTEM, by Vijayan Rajan, et al., now issued as U.S. Pat. No. 7,107,385 on Sep. 12, 2006, the teachings of which are hereby incorporated by reference. As will be made more clear with reference to the storage operating system 700 below, the exemplary destination filer 700 may be characterized more particularly as a multi-protocol storage appliance, capable of receiving storage requests according to a plurality of protocols and performing storage service operations according to either a file-based or block-based organization.

In the illustrative embodiment, the source volume 614 is mirrored to the destination volume using a qtree-based minoring technique, such as that described in the above-incorporated patent application entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al. However, it should be noted that the technique of the present invention may be utilized with any acceptable mirroring technique that may be suitably modified to utilize the teachings of the present invention. To facilitate the transfer of replica data from the source 610 to the destination 612 via the network 618, a formatted data stream 690 is employed. While it is contemplated that a variety of data transmission schemes and formats can be employed according to various alternate embodiments of this invention, and exemplary data format and related concepts are described in commonly owned U.S. patent application Ser. No. 10/777,978, entitled SYSTEM-INDEPENDENT DATA FORMAT IN A MIRRORED STORAGE SYSTEM ENVIRONMENT AND METHOD FOR USING THE SAME, by Stephen L. Manley, now issued as U.S. Pat. No. 7,478,101 on Jan. 13, 2009, the teachings of which are expressly incorporated herein by reference.

The destination storage system 612, as the repository of backup data, organized a set of PCPIs, interfaces with an administrator's management client 692. This can be any acceptable computer or terminal console that runs or manipulates a software backup management application 693 and that (in this example) provides the user/administrator with a graphical user interface (GUI) 694 for displaying and manipulating data. The graphical user interface in this embodiment employs a web-capable browser application 695 that enables data to be displayed and controlled via conventional web pages 696. The web pages are generated using conventional Hypertext Markup Language (HTML) script 697, an engine for which is provided in the backup management application 693. The administrator's management client, the user interface, and its communication with the file server are described, by way of further background, in U.S. patent application Ser. No. 09/862,949, entitled SYSTEM AND METHOD FOR CONSOLIDATED REPORTING OF CHARACTERISTICS FOR A GROUP OF FILE SYSTEMS, by Brian M. Hackworth, published as U.S. Patent Publication No. 2002/0175938 on Nov. 28, 2002, the teachings of which are expressly incorporated herein by reference. In an exemplary commercial implementation, the system software (for use with compatible third-party hardware) is available from Network Appliance, Inc. of Sunnyvale, Calif. as the Data Fabric Manager™.

Note, while a web-based user interface 694 with associated browser 695 and web-pages 696 is shown by way of example, it is expressly contemplated that the user interface can support an alternate graphical user interface or command-line interface standard. For example, the interface can be based upon common gateway interface (CGI) scripts, Sun Microsystems' Java™, or any other acceptable graphical user interface schema. Accordingly the terms "user interface" and "graphical user interface" should be taken broadly to include a variety of approaches to deliver information to a user, and to allow the user to act upon that information and issue commands thereupon.

The management client 692 interfaces with the destination system 612 through a network or other link 698. The interconnection between the management client 692 and the destination system 612 can be direct, or via a distributed network, such as a LAN or the Internet (618). As will be described further below, one protocol that is employed for communication between the management client 692 and destination system 612 is an appropriate version (version 3 or 4, for example) of the open source Network Data Management Protocol (NDMP). NDMP enables a standard set of functions and instructions to be transmitted between a source file system and backup device under control of a management application that is adapted to generate NDMP messages. In this embodiment, NDMP messages are communicated between the backup manager 693 on the management client and an NDMP extension 796 on the storage operating system 700 of the destination system. Where appropriate, an NDMP extension (685) can also reside on the operating system 611 of the source system 610. A full specification for various versions of NDMP is available via the World Wide Web at http://www.ndmp.org. By way of example, a description of NDMP Version 3 can be found in *NDMP-Network Data Management Protocol*, written by Network Working Group, R. Stager and D. Hitz, September 1997, the teachings Of which are expressly incorporated herein by reference. Note, while an open source NDMP is used in an exemplary embodiment herein, it is expressly contemplated that another communication protocol can be employed. In general, as depicted in FIG. 6, the source/primary and destination/secondary system(s) communicate through the network 618 with the backup manager 693 using NDMP management and control operations 699. This NDMP communication is represented herein as a set of dashed-line paths 601 that carry NDMP-formatted messages that carry out the management and control operations used in accordance with this invention.

B. Storage Operating System

In the illustrative embodiment, the storage operating system resident on the destination filler is the NetApp® Data ONTAP™ operating system available from Network Appliance, Inc., Sunnyvale, Calif. that implements a Write Anywhere File Layout is (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system and/or storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 7:
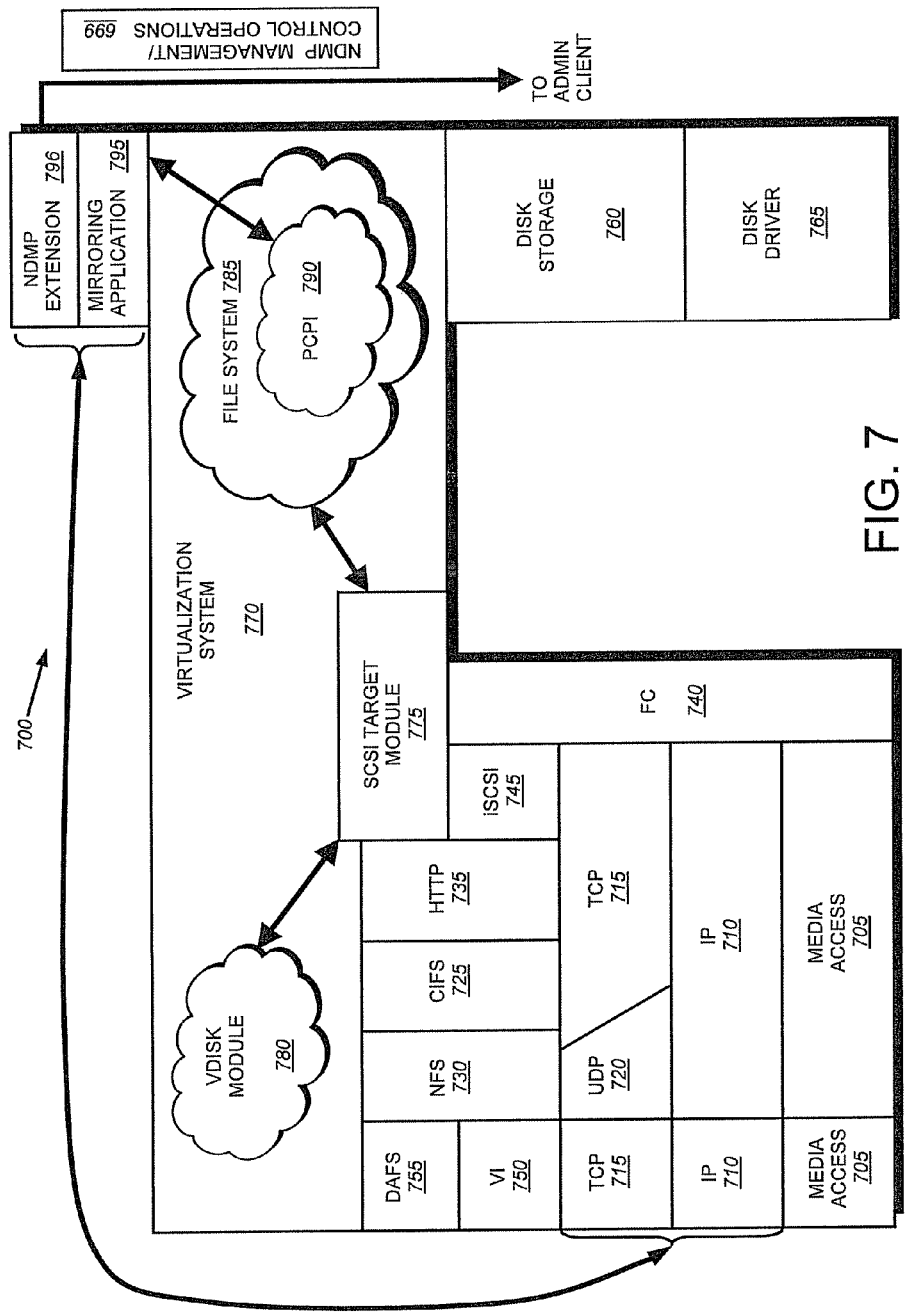
FIG. 7 an exemplary storage operating system running on the destination storage system in accordance with an embodiment of the present invention.

FIG. 7 is a schematic block diagram of an illustrative storage operating system 700 that may be advantageously used with the present invention. The storage operating system comprises a series of software layers organized to form an integrated network protocol stack or, more generally, a multi-protocol engine that provides data paths for clients to access information stored on the storage appliance using block and file access protocols. The protocol stack includes a media access layer 705 of network drivers (e.g., giga-bit Ethernet drivers) that interfaces to network protocol layers, such as the IP layer 710 and its supporting transport mechanisms, the TCP layer 715 and the User Datagram Protocol (UDP) layer 720. A file system protocol layer provides multi-protocol file access and, to that end, includes support for the DAFS protocol 755, the NFS protocol 730, the CIFS protocol 725 and the Hypertext Transfer Protocol (HTTP) protocol 735. A VI layer 750 implements the VI architecture to provide direct access transport (DAT) capabilities, such as remote direct memory access (RDMA), as required by the DAFS protocol 755.

An iSCSI driver layer 745 provides block protocol access over the TCP/IP network protocol layers, while a FC driver layer 740 operates with a Fibre Channel adapter in the filer 612 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage appliance. In addition, the storage operating system includes a disk storage layer 760 that implements a disk storage protocol, such as a RAID protocol, and a disk driver layer 765 that implements a disk access protocol such as, e.g., a SCSI protocol.

Bridging the disk software layers with the integrated network protocol stack layers is a virtualization system 770 that is implemented by a file system 785 interacting with virtualization modules illustratively embodied as, e.g., vdisk module 780 and SCSI target module 775. It should be noted that the vdisk module 780, the file system and SCSI target module 775 can be implemented in software, hardware, firmware, or a combination thereof. The vdisk module 780 interacts with the file system 785 to enable access by administrative interfaces in response to a system administrator issuing commands to the filer 612 in its arrangement as a multi-protocol storage appliance. In essence, the vdisk module 780 manages SAN deployments by, among other things, implementing a comprehensive set of vdisk (lun) commands issued through a user interface by a system administrator. These vdisk commands are converted to primitive file system operations ("primitives") that interact with the file system 785 and the SCSI target module 775 to implement the vdisks.

The SCSI target module 775, in turn, initiates emulation of a disk or lun by providing a mapping procedure that translates luns into the special vdisk file types. The SCSI target module is illustratively disposed between the FC and iSCSI drivers 740, 745 and the file system 785 to thereby provide a translation layer of the virtualization system 770 between the SAN block (lun) space and the file system space, where luns are represented as vdisks.

The file system 785 illustratively implements the WAFL file system having an on-disk format representation that is block-based using, e.g., 4-kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., the teachings of which are hereby incorporated by reference.

The storage operating system 700 further includes, in the illustrative embodiment, a mirroring application 795 that performs volume-based, qtree-based, or another subvolume level mirroring/backup function. The mirroring application 795 is illustratively integrated with the TCP 715 and IP 710 layers and a PCPI processes 790 within the file system 785. The mirroring application 795 utilizes TCP/IP for communication with the upstream and/or downstream within a cascaded chain of storage systems. The mirroring application 795 utilizes the PCPI processes 790 within the file system 785 to determine changed blocks within volumes and/or qtrees.

As described briefly above, overlying the storage operating system 700 is the NDMP extension, executing a version of the NDMP standard in accordance with the above-referenced open source specification. The NDMP extension interfaces with the mirroring application 795 and with the networking layers 710 and 715. It allows the administrator to monitor and browse the directory structure residing on the destination (via the mirroring application), and to instruct the mirroring application to restore selected data to the source as desired.

C. Remote Asynchronous Mirroring

By way of further background, the general principles of remote asynchronous minoring of a volume or sub-volume/qtree data set from a source to a destination are described in detail in the above-incorporated U.S. patent application Ser. No. 10/100,950, entitled SYSTEM AND METHOD FOR ASYNCHRONOUS MIRRORING OF SNAPSHOTS AT A DESTINATION USING A PURGATORY DIRECTORY AND INODE MAPPING by Stephen L. Manley, et al., now issued as U.S. Pat. No. 7,225,204 on May 29, 2007, and other related applications incorporated hereinabove. The illustrative embodiment of the invention employs the techniques described in these above-incorporated patent applications to receive and store, as a replica data set of the source, on the destination side, a data stream generated by the source. The source data may be organized in a variety of manners and appropriate mechanisms on the source side (in its replication agent 613) are used to generate the formatted data stream 690 in accordance with the illustrative embodiment of this invention. In one embodiment, both the source system and the destination system include respective pipelines (described further below) for generating and decoding the formatted data stream.

Figure 8:
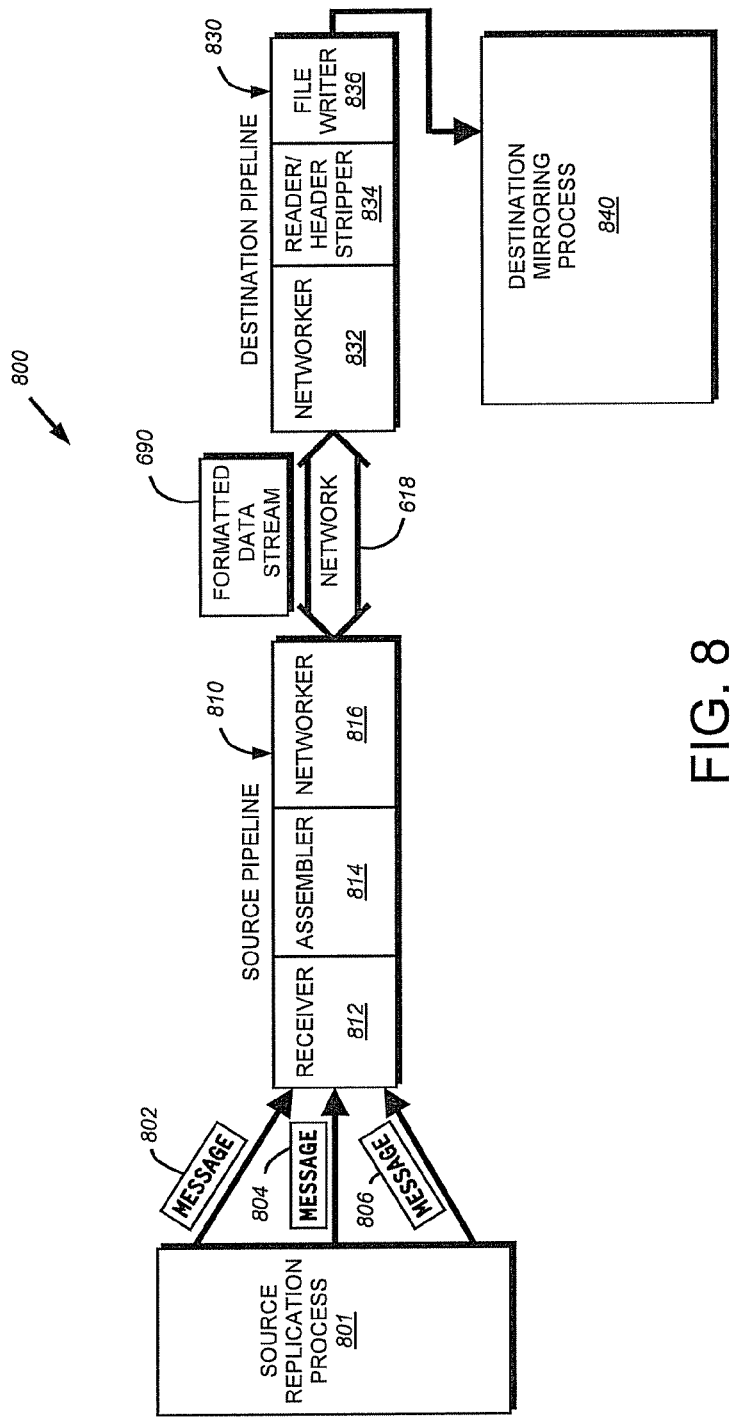
FIG. 8 is a schematic block diagram of a transmission scheme for data across a network between a source storage system and a destination storage system.

With further reference to FIG. 8, the transmission of data to be backed up from the source system to the destination replica is described in a simplified overview 800. The replication process 801 each sends messages 802, 804 and 806 containing the change information to a source pipeline 810. Note that this pipeline is only an example of a mechanism to implement a mechanism for packaging file system data into the formatted data stream 690 and sending that stream to a network layer. The messages are routed first to a receiver 812 that collects the messages and sends them on to an assembler 814 as a group comprising the snapshot change information to be transmitted over the network 618. Again, the "network" as described herein should be taken broadly to include anything that facilitates transmission of volume sub-organization (e.g. qtree) change data from a source sub-organization to a destination sub-organization, even where source and destination are on the same file server, volume or, indeed (in the case of rollback as described in the above-incorporated U.S. patent application entitled SYSTEM AND METHOD FOR ASYNCHRONOUS MIRRORING OF SNAPSHOTS AT A DESTINATION USING A PURGATORY DIRECTORY AND INODE MAPPING) are the same sub-organization at different points in time. An example of a "network" used as a path back to the same volume is a loopback. The assembler 814 generates the specialized format 690 described in detail below for transmitting the data stream of information over the network 618 that is predictable and understood by the destination. The networker 816 takes the assembled data stream and forwards it to a networking layer. This format is typically encapsulated within a reliable networking protocol such as TCP/IP. Encapsulation can be performed by the networking layer, which constructs, for example, TCP/IP packets of the formatted replication data stream.

As changed information is forwarded over the network, it is received at the destination pipeline piece 830. This pipeline also includes a networker 832 to read out TCP/IP packets from the network into the snapshot replication data stream format 690 encapsulated in TCP/IP. A data reader and header stripper 834 recognizes and responds to the incoming format 690 by acting upon information contained in various format headers (described below). A writer 836 is responsible for placing data derived from the format into appropriate locations on the destination file system. The storage and handling of backup data is implemented by the destination mirroring process 840. Note: the interface of the destination mirroring process with the backup manager, via NDMP, is described above with reference to FIG. 7 and further below.

Various details and embodiments of the mirroring/replication process 840 are described in detail in the above-incorporated SYSTEM AND METHOD FOR ASYNCHRONOUS MIRRORING OF SNAPSHOTS AT A DESTINATION USING A PURGATORY DIRECTORY AND INODE MAPPING and related applications thereto. Briefly, according to one example, the destination pipeline 830 forwards data and directory information to the main destination mirror process 840. The exemplary destination mirror process 840 consists of a directory stage 842, which builds the new replicated file system directory hierarchy on the destination side based upon the received changes in a PCPI on the source. To briefly summarize, the directory stage creates, removes and moves files based upon the received formatted information. A map of inodes from the destination to the source is generated and updated. In this manner, inode numbers on the source file system are associated with corresponding (but typically different) inode numbers on the destination file system. Notably, a temporary or "purgatory" directory is established to retain any modified or deleted directory entries until these entries are reused by or removed from the replicated PCPI at the appropriate directory rebuilding stage within the directory stage. In addition, a file stage of the destination mirror process populates the established files in the directory stage with data based upon information stripped from associated format headers.

D. Backup Manager

Figure 9:
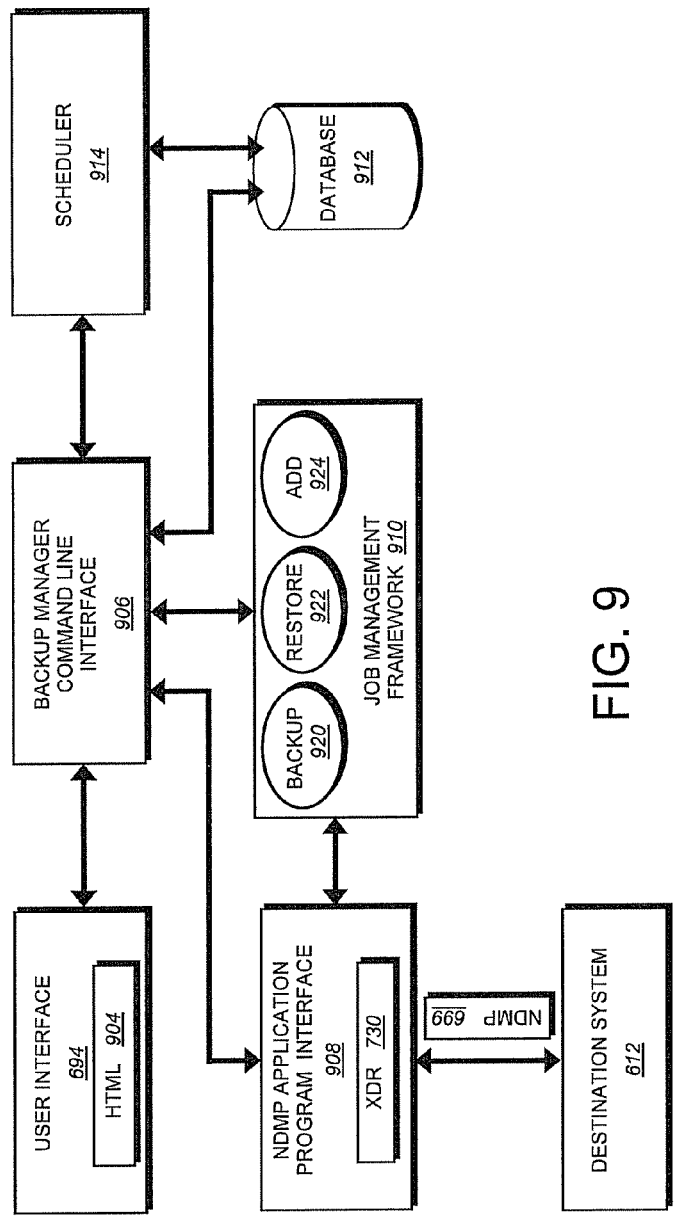
FIG. 9 is a more-detailed schematic block diagram of the backup management client as shown in FIG. 6.

FIG. 9 shows the architecture of the backup manager and its associated elements in further detail. As described above, the graphical user interface (GUI) 694 allows the user to browse and restore various PCPI-based versions of the backup data. It generates HTML forms for managing backup relationships. When a request is made, the GUI invokes the backup manager's command line interface (CLI) 906 to fulfill the request. Pages containing desired information are accessed by a browser using "http://" address formats. The CLI 906 interfaces with a number of resources including the NDMP application program interface (API) 908, job management framework 910, database 912 and scheduler 914. The CLI services both GUI and CLI users (other applications, etc). Some commands are directed only to the GUI and not visible to other CLI users. Most commands rely upon the job management framework to manage their tasks, whereas other commands directly query the database 912. The database stores data with respect to various devices, users and data structures (for example, volumes, directories, files and qtrees) associated with the source and destination. This information is used to assist in building web pages. Other CLI commands use the NDMP API 908 to synchronously retrieve data from the destination and source systems.

The job management framework 910 provides an infrastructure for abstracting complex operations (e.g. a restore operation having many steps to complete) into a high-level, user-friendly concept. Each high-level concept is characterized as a discrete "job." Some examples of "jobs are backing up a destination volume (922), restoring files to a source directory (922) and adding a source storage system (or filer) to the backup management structure of this embodiment (924). The framework 910 provides primitives for starting parallel operations, logging job status and messages, aborting in-progress operations and other job-handling functions.

The NDMP API 908 provides an interface to all requests defined in the NDMP extension 796 (FIG. 7) that are adapted to deal with the mirroring application 795 as well as any other extension that may be needed by the backup management application to interface with the destination system 612. Any non-blocking NDMP messages and NDMP notifications (as defined by the NDMP specification) are handled transparently by the API 908. Each NDMP API function (except abort and abort-in-progress) refers to a single connection between the backup management application and the destination or source storage system. Note that the API may include a software developer's kit (SDK) that implements an XML Data Reduced (XDR) 730 encoding schema. This is used where the API may be interfaced with a Microsoft Windows™ environment that does not include a native XDR (unlike other commercially available systems).

The scheduler 914 is a long-running process that interfaces with the database 912 and the CLI 906. In this embodiment, it is adapted to "wake up" or otherwise activate hourly (or another desired time interval), wherein it checks the backup schedules stored in the database 912. Once the schedule is checked, the scheduler initiates any backup jobs that are due. Scheduled jobs are created using the job management framework 910. The jobs are saved to the database and run in a background process.

E. Backup Manager Operations

Figure 10:
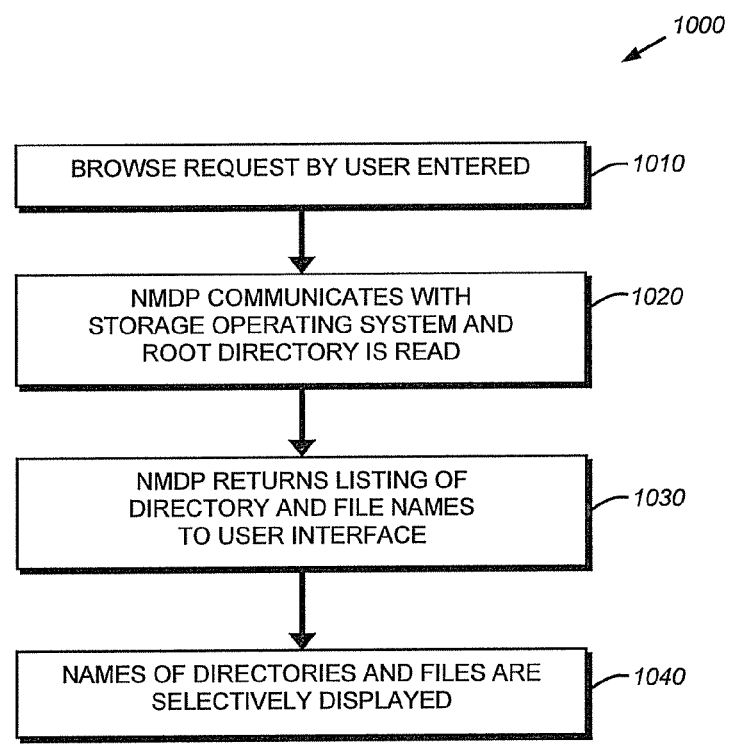
FIG. 10 is a flow diagram of an exemplary browsing procedure according to an embodiment of this invention.

The backup management application performs a number of functions that are manipulated through the various pages of the GUI 694 (described in further detail below). For the purposes of this description two significant functions are the ability to browse the destination system's file system to locate and retrieve various backups based upon time-created, identity of the source system (for example the particular filer) volume, directory and the like. A basic flow diagram for a browse request procedure 1000 is shown in FIG. 10. The user enters a browse request after accessing the appropriate web page on the GUI (step 1010). Using the API 908 NDMP formulates the appropriate request for data and transmits it to the destination storage system (or source storage system where appropriate). The storage system, via the NDMP extension 796, communicates with the mirroring/replication application and reads the directory tree through a volume information block that points to various file system information blocks (which may include roots for PCPIs), or other data indexing structures, to derive the requested data tree. Typically, data regarding each of the stored PCPIs is included in the tree so that a full picture of various volumes, files and directories (and qtrees, etc.) can be accessed at once. In other words, where information on a given directory is requested, the full range of PCPIs containing that directory (e.g. the root of each relevant PCPI) is located and read. Each PCPI has an appropriate "create" date and respective tree of attached directories and files. Where files have been added, changed or deleted from one PCPI to another, the change can be quickly determined by reading out the tree of blocks defined by the particular PCPI being queried.

Once the requested information has been read at the storage system, the NDMP extension in step 1030 returns the information (e.g. returns existing PCPIs and directories therein) in the NDMP format to the API, and whence to the GUI. This information is displayed as a web page, or any other acceptable user interface/graphical user interface format (see below) with the desired information for the user to act upon (step 1040).

Figure 11:
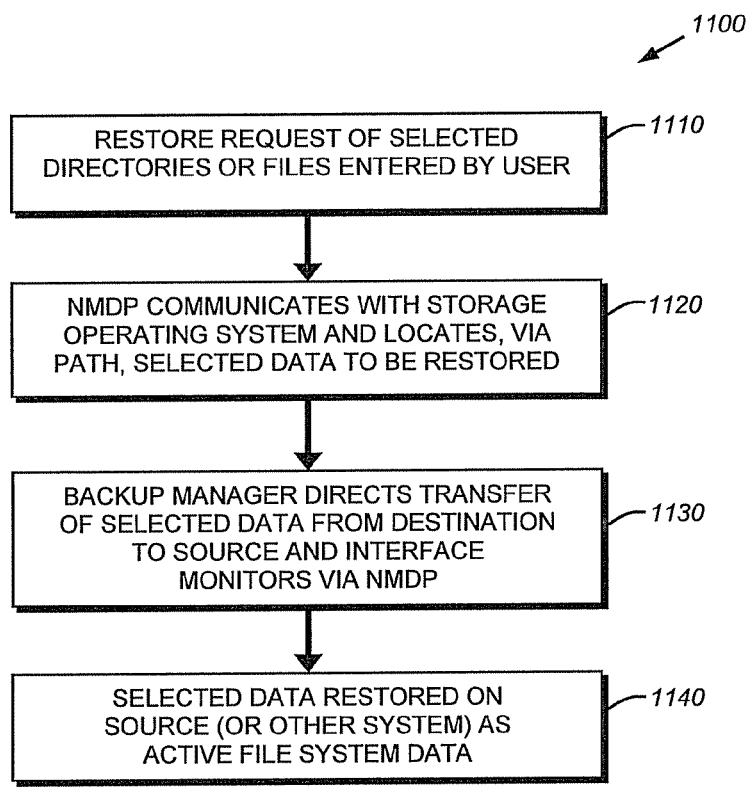
FIG. 11 is a flow diagram of an exemplary restore procedure according to an embodiment of this invention.

Unlike the browse command, the restore command involves both the destination and source, under control of the backup management application. FIG. 11 describes a restore procedure 1100 carried out according to a user/administrator request. Typically, certain files, directories, qtree or volumes are searched in the browse phase (procedure 1000), or the path(s) and name(s) of appropriate backup data is otherwise determined. The desired path/name is entered into the GUI by the user/administrator (step 1110), and the API 908 formats this request into NDMP. The request is routed through the NDMP extension where it is acted upon by the mirroring/replication application 795. The path is transmitted and used by the destination mirroring application to locate the data to be restored (step 1120). The application then carries out a restoration process by transmitting the data to the source (or another target system) (step 1130) in accordance with conventional copying techniques or by implementing a "replication" process (as described herein) in the reverse direction, from destination back to source, whereby the source is treated as a "destination" for receipt of the backup data (step 1140).

Where the user/administrator desires a backup process to be performed from the source to the destination, the source is messaged via NDMP over the network from the GUI to perform the backup in a manner similar to the restore process 1100 of FIG. 11. A PCPI, or another type of image (where, for example, a non-PCPI/snapshot open system source is present) of a to-be-backed-up directory, volume or qtree is returned (in the formatted data stream) over the network from the source to the destination in response to the backup request. This data builds an appropriate PCPI on the destination side where it is stored in the destination file system at the appropriate location in the tree. Backups may occur under control of the scheduler 914, at periodic intervals. The rules (e.g. backup time interval, data to be backed-up, etc.) for performing such scheduled backups can be provided by the user through the GUI. Likewise, unscheduled backups of selected data can be made after browsing, or otherwise identifying, the source data to be backed up. In the case of both restore and backup functions, NDMP-based confirmation and notification messages may be provided when a process is ongoing, complete, aborted or failed.

F. User Interface

The following is a description of various user interface "web pages" displayed by the GUI according to an embodiment of this invention and various generalized functions that they perform.

Figure 12:
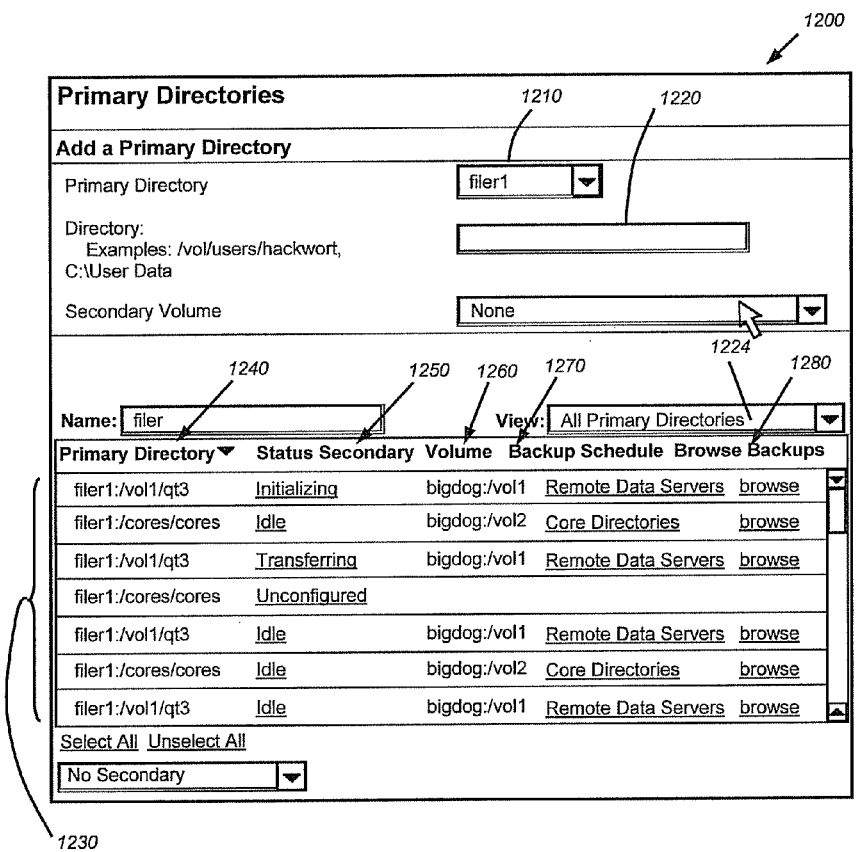
FIG. 12 is a diagram of a graphical user interface screen showing a listing of backed-up or protected directories according to an embodiment of this invention.

FIG. 12 shows a diagram of an exemplary GUI screen display 1200 listing source (primary) directories that are backed-up or "protected." In this embodiment, the storage system can be selected for reviewing via selection box 1210. Another box (not shown) provides a listing of source (primary) storage systems (e.g. discrete filers, etc.). The primary directory box 1220 allow the user to enter desired primary directories that are not currently known to the backup manager, and which the user desires to include in the listing 1230. All primary directories (view window 1224) for a selected storage system (filer) that are currently known by the backup manager are listed in the listing 1230. Hence, the listing 1230 provides those directories that are already backed up. In this example, the listing 1230 includes directory name/path 1240, a current status 1250, respective volume (or other data organization) in which the directory resides 1260, backup schedule for that directory (1270) and "browse backup" buttons 1280. By clicking on status for a given directory or backup schedule, information in web page format is displayed regarding these respective items. These items may be retrieved from the database as needed. Likewise, by clicking the browse backup for a given directory, screen 1300 in FIG. 13 is displayed. This screen contains a listing of all relevant backups from the destination for that directory. It is created as described above, by an NDMP request to the destination minoring application, which scans the tree for PCPI's containing the desired directory within their tree structure. The name of the source/primary volume is provided at location 1310 and the name of the destination/secondary (backup) volume is also provide at location 1320. The "browse backups" screen contains a listing 1330 backups indexed in this example according to time. They may be divided into hourly and daily (or weekly, etc.) versions. A relative time 1340 for each list entry is provided and a restore button allows any backup to be readily restored to the source in a manner described above. The restore button causes an NDMP message to be transmitted to the destination so that the mirroring application can undertake a restore (by either a copy process or reverse replication process from destination back to source) of the selected directory to the appropriate prior PCPI indexed by the browse backups list 1330.

FIG. 14 details a screen 1400 that lists the secondary storage systems available for backups in a listing 1410. Additional secondary storage systems (destination file servers/filers) can be added to the management client's control by providing the necessary information 1420 including system name, NDMP user name and password. The new system should have NDMP enabled, and must be able to accept NDMP commands related to the replication and backup system described herein before being added. The relative volumes 1430 that are available to store backups within each system are listed. Each system has associated therewith an "edit" button 1440 that, when clicked, calls an edit screen 1500, shown in FIG. 15. This screen shows the subject destination system 1510. The screen requires the user to enter his or her NDMP user name 1520 and password 1530 to access edit functions. If accepted, the volumes within the system-to-be-edited are listed in screen 1600 of FIG. 16.

FIG. 16 details a destination/secondary volumes listing for a selected destination system (box 1610). Secondary volumes not yet known to the backup manager may have their path entered into box 1620 by the user/administrator to become associated with the secondary volume listing 1630. All known secondary volumes are listed in the listing 1630. These are obtained through an NDMP request to the destination system. They may be subsequently returned to the GUI and concurrently stored in the database for later use. The listing 1630 includes destination/secondary volume name 1640, backup schedule 1650, status 1660, associated source/primary volumes from which backups are received (1670), a "browse backup" button 1680 and "edit" button 1690.

Figure 17:
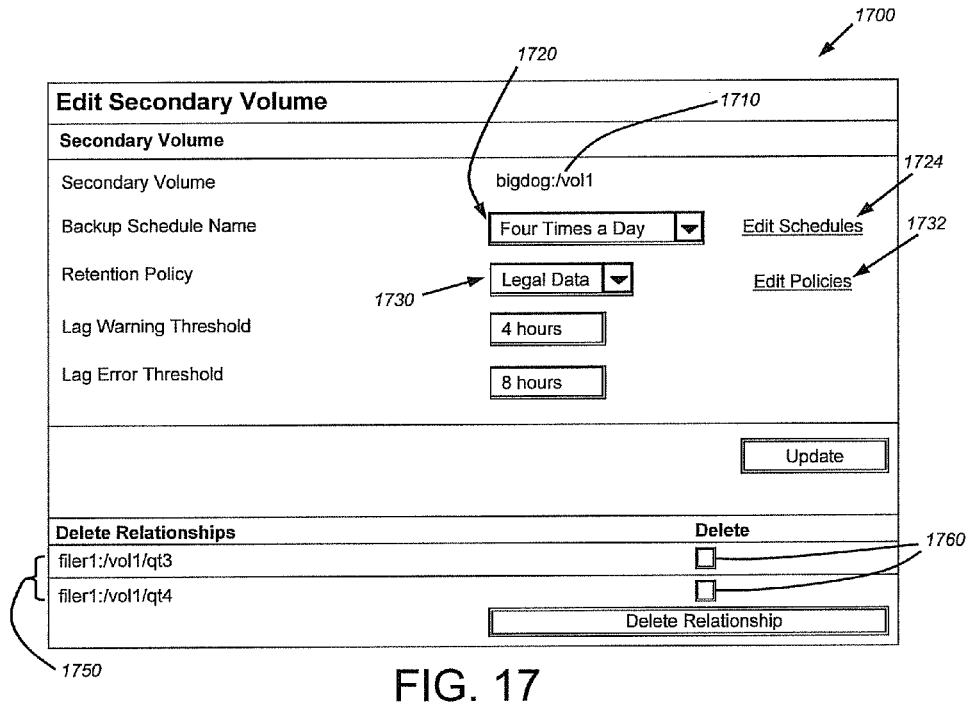
FIG. 17 is a diagram of a graphical user interface screen for editing parameters of destination volumes according to an embodiment of this invention.
Figure 18:
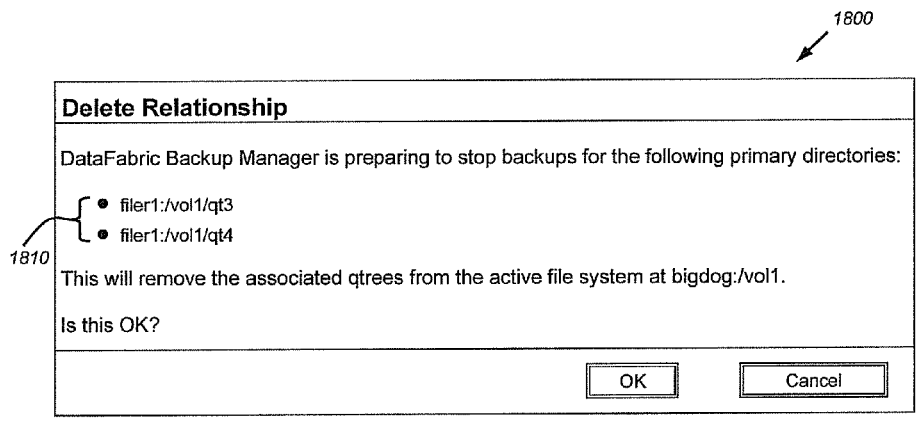
FIG. 18 is a graphical user interface screen for confirming deletion of relationships in accordance with the graphical user interface screen of FIG. 17.

By clicking the "edit" button 1690 for a selected volume, the screen 1700 of FIG. 17 is displayed to the user. This screen enables the user to change various volume parameters and/or storage rules. The volume is identified by name at location 1710 on the screen 1700. The volumes backup schedule can be changed according to a predefined menu of time intervals 1720, or the schedule can be edited further via the button 1724. Likewise, retention policy can be set. For example, certain types of documents may require greater approval before deletion or restoration. This also allows specialized storage policies including write-once-read-many (WORM) options to be employed. Note, once WORM policies are invoked for a volume, they cannot typically be further changed except to be made even stricter. In addition, the screen 1700 includes a delete relationship option, applied herein to a list 1750 of qtrees (or another sub-volume-level data organization) residing on the source/primary system. Each qtree in the list is provided with a delete box that, when checked, is selected for deletion. When the delete box for a respective qtree is checked, then the screen 1800 (FIG. 18) appears, showing the to-be-deleted relationships 1810 and confirming whether the user wishes to proceed. Only the relationships for those qtrees that are checked for deletion will be deleted.

Figure 19:
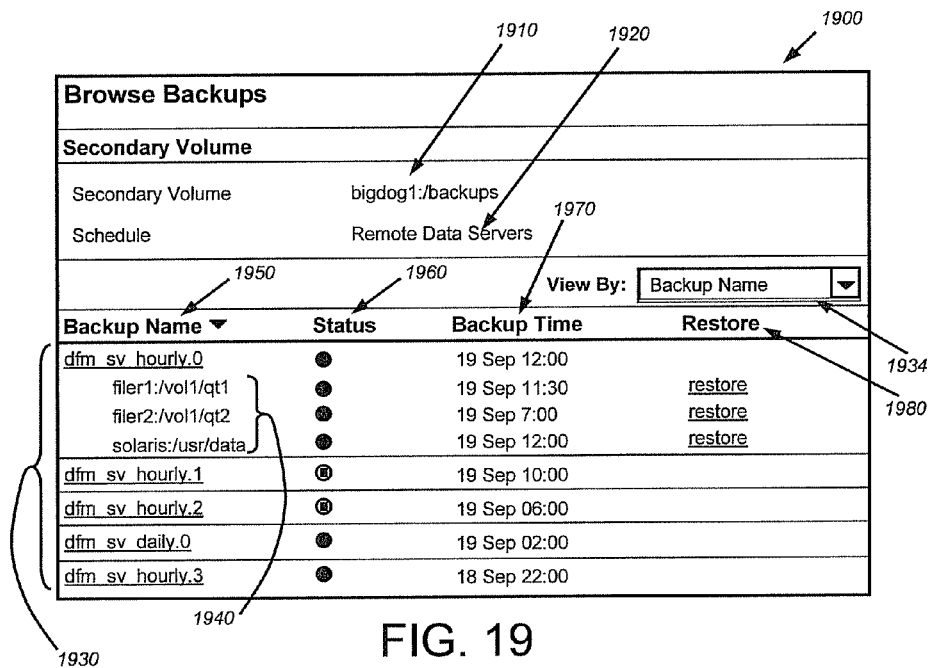
FIG. 19 is a diagram of a graphical user interface screen showing a listing of destination volume backups indexed according to backup name according to an embodiment of this invention.

When clicking the "browse backups" button 1680 for a given volume in FIG. 16, the screen 1900 of FIG. 19 is displayed. This screen shows the subject destination/secondary volume 1910 and the selected schedule for backup. Note, the backup schedule in this example and others herein is keyed to a particular source data-type, such as "remote data servers" (as depicted). This translates into a predefined backup time schedule (e.g. hourly, daily, etc.). The backups are based upon PCPIs and listed according to time parameters (e.g. hourly, daily) in the listing 1930. In this example, the data is indexed in the listing particularly according to the "backup name" in accordance with the entry in the menu box 1934. The listing for any backup can be sub-divided by clicking the name 1950 to list (1940) associated qtrees or other data structures (such as Sun Microsystem's Solaris® system data as shown. An associated status indicator 1960 is provided for each entry as well as the associated backup time 1970. This can be the "create time" for the underlying PCPI, read from the backup's "properties" data in the directory tree and stored at the appropriate block. Note that the individual data sets (qtrees, etc) in the browse backups listing window 2000 are associated with a "restore" button 1980, which allows each of them to be selectively restored by clicking the associated "restore" tag for that data set in the listing.

Figure 20:
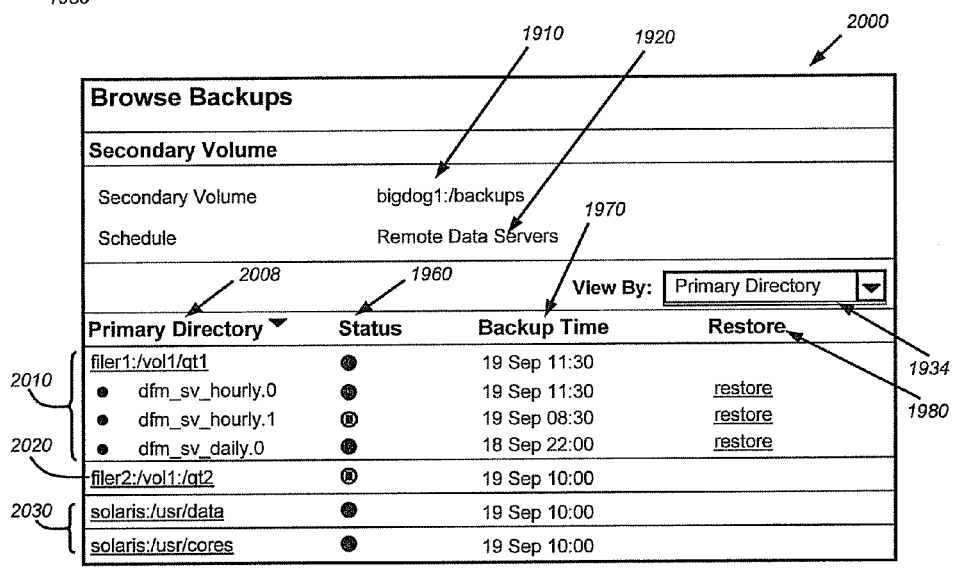
FIG. 20 is a diagram of the graphical user interface screen of FIG. 19 showing a listing of destination volume backups indexed according to source directory association according to an embodiment of this invention.

In FIG. 20, the "browse backups" screen 2000 still relates to the same destination/secondary volume and schedule as shown in FIG. 19. However, the listing is chosen in box 1934 based upon source or "primary directory." As such, the leftmost column 2008 is now ordered by filer, and all of Filer 1's entries 2010 are listed first, followed by filer 2's (2020) and the Solaris® entries 2030 next. It should be clear that information can be browsed according to a variety of parameters quickly and easily. This is because all salient information about the backup structure is retrieved quickly from the file system tree for immediate application by the backup manager. A number of other parameters can be used to order and index the information in the browse backups screen, thereby providing the user with maximum convenience and ease of use.

Figure 21:
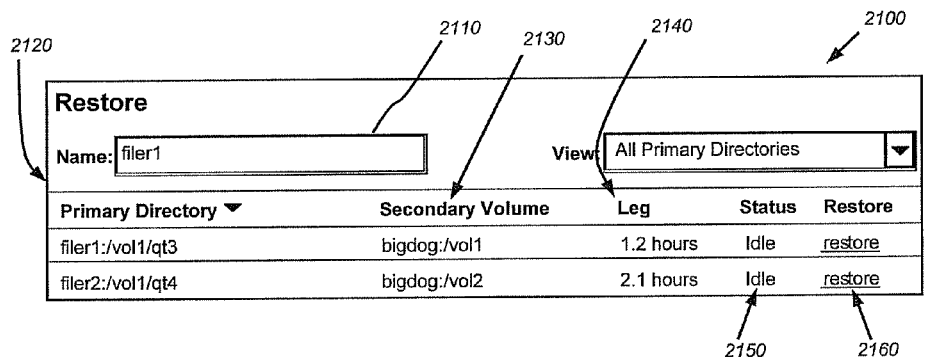
FIG. 21 is a graphical user interface screen for directing a restore of selected directories on the destination volume to the source system according to an embodiment of this invention.
Figure 22:
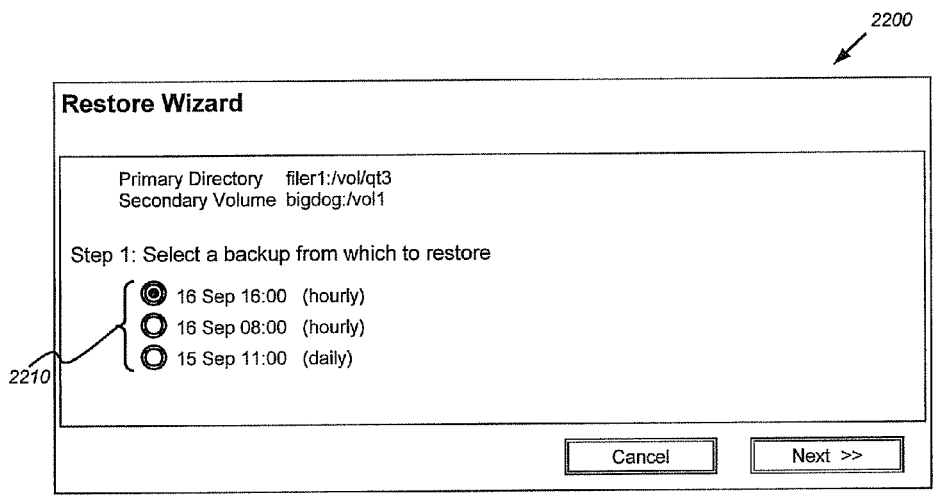
FIG. 22 is a graphical user interface screen for selecting a specific backup to restore from a listing of directories in FIG. 21 according to an embodiment of this invention.
Figure 23:
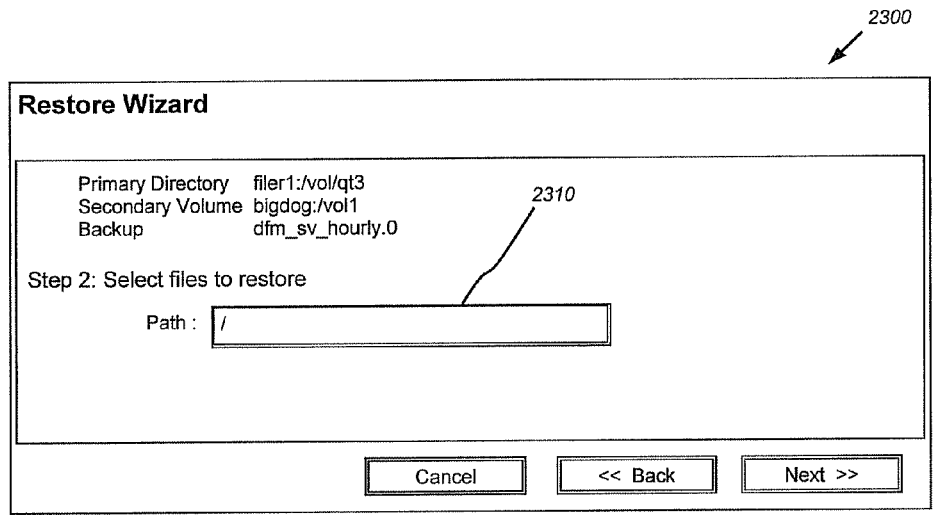
FIG. 23 is a graphical user interface screen for selecting a path for files and directories from the backup selected in accordance with FIG. 22 to restore according to an embodiment of this invention.

If the user clicks the restore button 1980 on a given directory, the backup manager GUI directs the user through a number of screens that specify which files or other data containers from a selected directory will be restored, and from which backup. First, in screen 2100 (FIG. 21) the user selects the source directory (see box 2110). The source directory selected can be the directory from which the backup data originated or another system's directory where appropriate (for example, a different system to restore-to when the source has been destroyed. The source or primary directories are indexed in this example. Their associated destination/secondary volumes are displayed in column 2130. The "lag" 2140 is shown for each source/primary directory entry, indicating the time between the backup and present. Status of each entry 2150 is also displayed. Each entry also has an associated "restore" button. When a given directory is then selected to restore, a restore wizard screen 2200 (FIG. 22) is displayed. This screen gives a choice of available backups, typically based upon a given time increment. The user selects one for restoration and the display provides screen 2300 (FIG. 23). This includes a path box that allows the user to enter the files or directories from the selected backup that he or she wishes to restore. In this example, where a full restore is desired (e.g. simply placing a "/" into the path box 2310, the path to which the data is to be restored must be removed or not otherwise exist.

Figure 24:
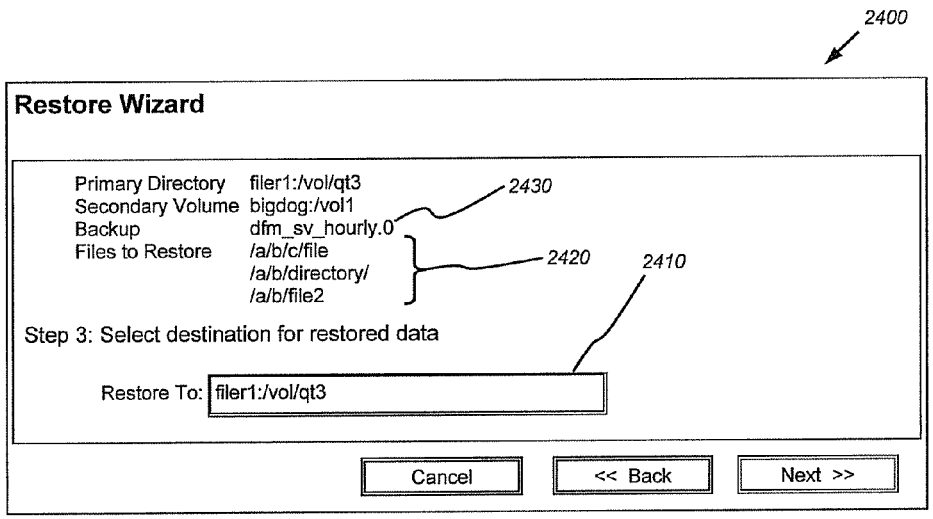
FIG. 24 is a graphical user interface for selecting a path in the destination system to which to restore the files and directories selected in accordance with FIG. 23.
Figure 25:
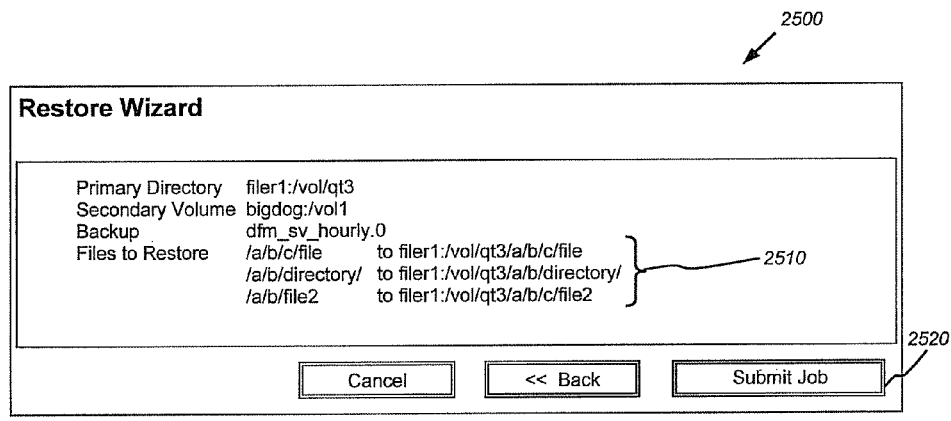
FIG. 25 is a graphical user interface for confirming the restore job selected in accordance with FIGS. 21-24 according to an embodiment of this invention.
Figure 26:
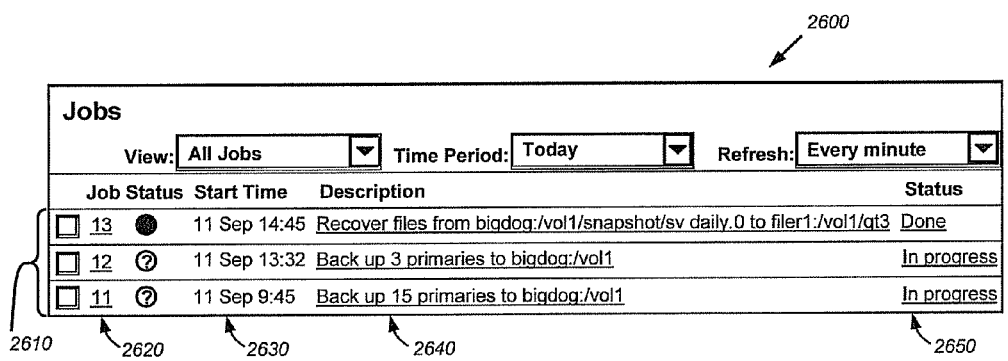
FIG. 26 is a graphical user interface screen for showing recent and ongoing jobs performed by the backup management application according to an embodiment of this invention.

Once the files and/or directories for restoration are selected, the destination 2410 is selected in screen 2400 (FIG. 24). The files to be restored are shown in the listing 2420, and the backup 2430 from which they were selected is also displayed. Finally, the restore wizard displays screen 2500 (FIG. 25) in which the user must submit the displayed restore job (2510) by clicking the "submit" button. Once submitted the job is transmitted to the job management framework 910 for completion. Jobs can be monitored by the user by accessing screen 2600 (FIG. 26), which lists (2610) recently completed and on-going jobs. The job's queue number 2620, start time 2630, description 2640 and status 2650 are each shown. The job description entry can be clicked for a selected job to reveal its progress. A variety of progress benchmarks can be displayed.

Figure 27:
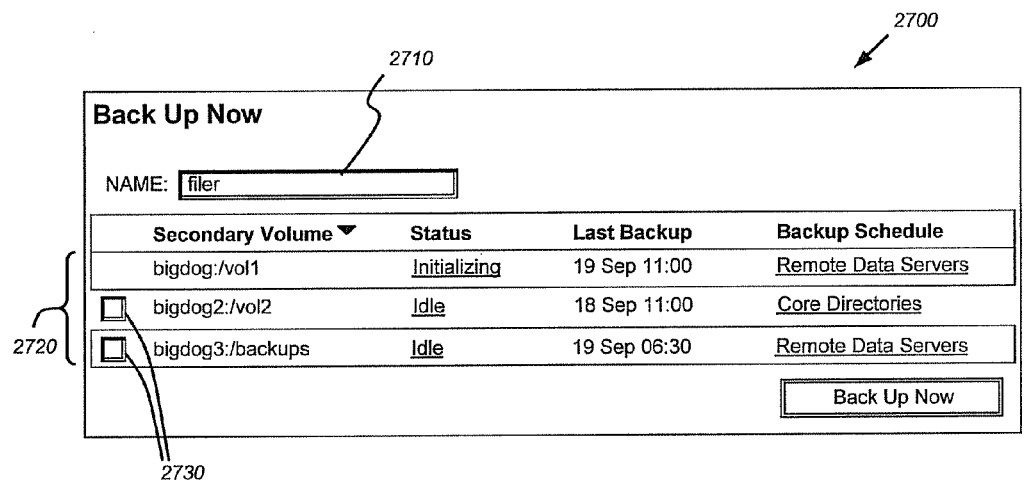
FIG. 27 is a graphical user interface screen for selecting an unscheduled backup of source system data to the destination system according to an embodiment of this invention.

While backups are typically carried out according to a preset schedule, any destination/secondary volume that is already configured can be backed-up at an unscheduled point in time. Screen 2700 (FIG. 27) can be accessed as a top-level menu item in the GUI when an unscheduled backup is desired. A desired secondary/destination system is selected in the selection box 2710. It causes all source/primary volumes associated with the selected secondary system to be listed (2720). Check boxes 2730 can be flagged on inactive/idle secondary volumes to allow these systems to be selected to receive backups from their associated primaries immediately with current data from the associated primary/source(s). Volumes engaged in an ongoing process cannot be flagged for immediate backup and no check box is displayed.

Figure 28:
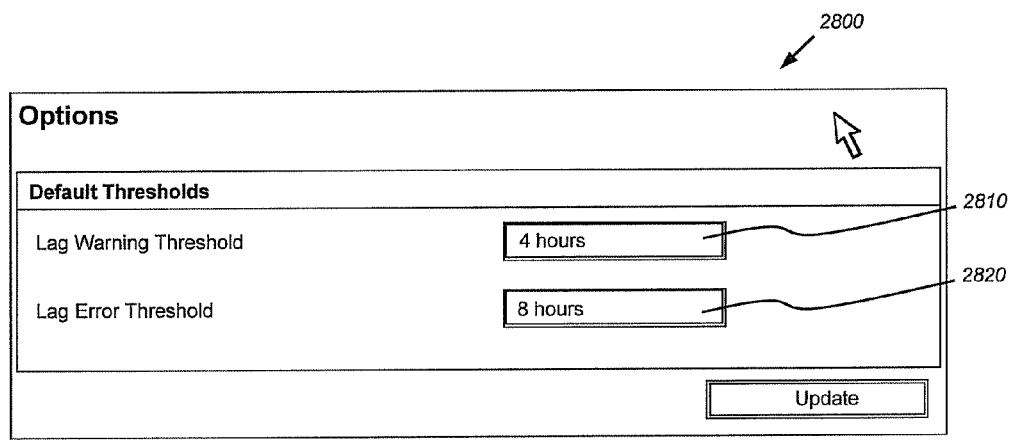
FIG. 28 is a graphical user interface screen for setting lag thresholds between backup operations according to an embodiment of this invention.

In maintaining the health and security of a backup system, the backup management application should monitor the time between backups (termed herein the "lag"). As a top menu function, the GUI also allows access by the user to a threshold option screen 2800 (FIG. 28). The user may set a value 2810 at which the management application alerts the user with a warning (message box) that the lag between backups/replicas has exceeded a certain time value. A second value 2820 is set with an error threshold. Any lag exceeding this second value causes the management application to generate an error event with appropriate alerts to system authorities. These values are overall rules applied to the management system. They can be modified for selected volumes or systems as described generally above with respect to, for example, the volume-edit functions of FIG. 17.

Note that the functions of the various GUI screens described herein may be carried out by the backup manager CLI 906 by automatic or non-user-initiated functions in various applications. Appropriate CLI command scripts are employed by the applications to carry out these functions via the CLI.

The foregoing has been a detailed description of embodiments of the invention. Various modifications and additions can be made without departing from the spirit and scope thereof. For example, while files and directories are denoted herein, the data can be organized around a variety of data structures and the terms "file," "file system," "directory" and the like should be taken broadly to include a variety of "data structures," "data sets," or "data organizations." Likewise, while the disk storage layers utilizes a RAID organization, it is contemplated that a variety of storage arrangements can be employed. Similarly, while the storage devices described herein are disks, the principles of this invention can be applied to a variety of storage devices or media including, but not limited to, electro-optical, solid-state, magnetic, and the like. Finally, it should be understood that any and all of the principles described herein can be implemented as hardware, software that consists of a computer readable medium executing program instructions on a computer, or a combination of hardware and software. Accordingly, this description is meant to be taken only by way of example, and not to otherwise limit the scope of this invention.

What is claimed is:

1. A system for indexing and manipulating backup data stored on a destination storage system, comprising:
one or more source storage systems configured to transmit the backup data to the destination storage system;
a management client comprising a processor configured to execute a management application, the management application configured to communicate with the destination storage system and further configured to access data identifiers related to the backup data organized in a directory tree representing a plurality of persistent consistency point images (PCPIs) of the backup data, wherein each PCPI is associated with a creation time, the management application further configured to scan the directory tree through at least one volume information block configured to reference each root of each PCPI comprising the directory tree to generate an index of directories, files, or qtrees associated with the directory tree, the management application further configured to organize the data identifiers to enable display of the backup data on a display screen of the management client; and
a user interface of the management client configured to select a directory, a file, or a qtree to view, and, in response to the selection, the management client further configured to query the management application, and, in response to the query, further configured to return a list of the selected directory, file, or qtree and one or more versions of the selected directory, file, or qtree.

2. The system as set forth in claim 1 further comprising a database coupled to the management client configured to store the data identifiers and rules for handling the data identifiers for retrieval by the user interface and the management application.

3. The system as set forth in claim 1 further comprising, in the destination storage system, a network data management protocol (NDMP) extension communicating with a storage operating system of the destination storage system and providing NDMP-based communication between the management application and the storage operating system.

4. The system as set forth in claim 3 further comprising a job management framework of the management client, the job management framework configured to organizes one or more backup operations and restore operations by the management application and that communicates with the user interface to enable a user to access information with respect to status of the backup operations and restore operations organized by the job management framework.

5. The system as set forth in claim 1 further comprising a scheduler of the management client configured to interfaces with at least one of the one or more source storage systems, perform the backup operations, and transmit the backup data from the at least one source storage system to the destination storage system at a predetermined time interval.

6. The system as set forth in claim 1 wherein the display screen of the management client is configured to enable a user to set a desired lag time after which failure to complete a scheduled backup operation causes an event to occur.

7. The system as set forth in claim 1 wherein the user interface of the management client is further configured to select a listing of source data entries indexed by names of at least one of the one or more source storage systems and to select another listing of source data entries indexed by names of volumes of the destination storage system in which the backup data resides.

8. The system as set forth in claim 7 wherein the display screen of the management client comprises a button configured to enables a user to view the backup data stored on the destination storage system that is associated respectively with each of the entries.

9. The system as set forth in claim 7 wherein the display screen of the management client comprises a button configured to enables a user to view restorable backup data structures with respect to each of the entries and to restore the backup data structures.

10. The system as set forth in claim 1 wherein each qtree comprises one or more qtree relationships with respect to other qtrees within at least one of the one or more source storage systems.

11. The system as set forth in claim 1 wherein the user interface of the management client comprises a command for destroying a qtree relationship between source data and a selected volume of the backup data in the destination storage system.

12. The system as set forth in claim 11 wherein the management application is further configured to delete a respective qtree associated with the qtree relationship on the destination storage system in response to activation of the command for destroying the qtree relationship.

13. The system as set forth in claim 1 wherein the display screen of the management client is configured to enable selected data of source data to be listed as entries and to be transmitted as the backup data to the destination storage system at a time separate from a scheduled backup time.

14. A computer implemented method for indexing and manipulating backup data stored on a destination storage system from source data stored on a source storage system, comprising:
   communicating, by a management client, with the destination storage system and accessing data identifiers related to the backup data organized in a tree structure and representing a plurality of persistent consistency point images (PCPIs) of the data, each with associated information related to a creation time;
   scanning the tree structure through at least one volume information block configured to reference each root of each PCPI comprising the tree structure to generate an index of directories, files, or qtrees created at different points in time;
   organizing the data identifiers to enable display of the data on a display screen of the management client according to the directory, the file, or the qtree; and
   selecting, on a user interface of the management client, a specified directory, file, or qtree to view, and, in response to the selection, querying the management client, and, in response to the query, returning a list of the specified directory, file, or qtree created at different points in time.

15. The method as set forth in claim 14 further comprising storing, in a database coupled to the management client, the data identifiers and rules for handling the data identifiers for retrieval by the user interface and the management application.

16. The method as set forth in claim 14 further comprising providing, in the destination storage system, a network data management protocol (NDMP) extension communicating with a storage operating system of the destination storage system and providing NDMP-based communication between the management application and the storage operating system.

17. The method as set forth in claim 16 further comprising organizing, in a job management framework of the management client, one or more backup operations and restore operations by the management application and communicating with the user interface to enable a user to access information with respect to status of the backup operations and restore operations organized by the job management framework.

18. The method as set forth in claim 14 further comprising interfacing a scheduler of the management client with the source storage system and performing, at scheduled times, backup operations that transmit the backup data from the source storage system to the destination storage system at a predetermined time interval.

19. The method as set forth in claim 18 further comprising enabling a user to set a desired lag time after which failure to complete a scheduled backup operation causes an event to occur.

20. The method as set forth in claim 14 further comprising selecting a listing of source data entries indexed by names of the source storage system and selecting a listing of source data entries indexed by names of volumes of the destination storage system in which the backup data resides.

21. The method as set forth in claim 20 further comprising enabling a user to view, by the display screen of the management client, the backup data stored on the destination storage system that is associated respectively with each of the entries.

22. The method as set forth in claim 20 further comprising enabling a user to view, by the display screen of the management client, restorable backup data structures with respect to each of the entries and to restore the backup data structures.

23. The method as set forth in claim 14 wherein one or more of each qtree comprises qtree relationships with respect to other qtrees within the source storage system.

24. The method as set forth in claim 14 further comprising providing, by the user interface of the management client, a command for destroying a qtree relationship between source data and a selected volume of the backup data in the destination storage system.

25. The method as set forth in claim 24 further comprising, in response to activation of the command for destroying the qtree relationship, deleting a respective qtree associated with the qtree relationship on the destination storage system.

26. The method as set forth in claim 14 further comprising providing, by the display screen of the management client, a view that enables selected data of source data to be listed as entries and to be transmitted as the backup data to the destination storage system at a time separate from a scheduled backup time.

27. A method for managing backup of data, comprising:
scanning at least one volume information block referencing each root of a plurality of persistent consistency point images (PCPIs) comprising a particular tree structure stored on a destination storage system;
generating, by a management client operatively connected to the destination storage system, an index of qtrees in response to scanning the volume information block, each qtree comprising one or more versions created at different creation times;
selecting, by a query issued at the management client, a particular qtree to view of the index of qtrees; and
displaying, on a screen of the management client in response to the query, each version of the particular qtree created at the different creation times.

28. The method as set forth in claim 27 further comprising formatting information at the destination storage system into a network data management protocol (NDMP).

29. The method as set forth in claim 27 further comprising activating, via the user interface, user interface buttons associated with entries of the displayed qtree.

30. A computer-readable storage medium containing executable program instructions executed by a processor, comprising:
program instructions that scan at least one volume information block referencing each root of a plurality of persistent consistency point images (PCPIs) comprising a particular tree structure stored on a destination storage system;
program instructions that generate, by a management client operatively connected to the destination storage system, an index of qtrees in response to scanning the volume information block, each qtree comprising one or more versions created at different creation times;
program instructions that select, by a query issued at the management client, a particular qtree to view of the index of qtrees; and
program instructions that display, on a screen of the management client in response to the query, each version of the particular qtree created at the different points creation times.

31. The computer-readable storage medium as set forth in claim 30 further comprising program instruction that format information at the destination storage system into a network data management protocol (NDMP).

32. A system, comprising:
a source storage system configured to generate a plurality of persistent consistency point images (PCPIs) associated with a directory tree, and further configured to transfer the plurality of PCPIs to a destination storage system;
a management client comprising a processor configured to execute a management application the management application configured to scan the directory tree through at least one volume information block configured to reference each root of each PCPI comprising the particular directory tree to organize the plurality of PCPIs into an index using a database operatively connected to the management client configured to allow display of the plurality of PCPIs on a display screen of the management client as a listing of source data entries indexed by the directory tree, each PCPI of the directory tree created at one or more different creation times, and to allow display of the plurality of PCPIs on the display screen as a listing of source data entries indexed by names of the source storage system, and to allow display of the plurality of PCPIs on the display screen as a listing of source data entries indexed by names of volumes of the destination storage system in which backup data from the source storage system resides; and
an interface of the management client configured to select a data entry for the directory tree, and, in response to the selection, query the management application, and, in response to the query, further configured to return a list of the plurality of PCPIs associated with the directory tree.

33. The system of claim 32, wherein the database operatively coupled to the management client is further configured to store the plurality of PCPIs and rules for handling the plurality of PCPIs for retrieval by the interface and the management client.

34. The system of claim 32, wherein the source storage system, upon initialization, is further configured to send a base PCPI and select data to the destination storage system.

35. The system of claim 32, further comprising a scheduler of the management client configured to interfaces with the source storage system and performs one or more backup operations of transmitting the backup data comprising one or more PCPIs of the plurality of PCPIs and change data from the source storage system to the destination storage system at a predetermined time interval.

36. A computer implemented method, comprising:
transferring a plurality of persistent consistency point images (PCPIs) from a plurality of source storage systems to at least one destination storage system;
scanning at least one volume information block referencing each root of the plurality of PCPIs comprising a directory tree to create an index of data structures of the at least one destination storage system, each data structure comprising a plurality of qtree versions created at different creation times;
selecting a first data structure to view;
in response to the selection, querying the at least one destination storage system, and in response to the query, returning all qtree versions created at the different creation times for the first data structure; and
selecting a first qtree from the returned qtree versions created at the different creation times to restore.

37. A system, comprising:
at least one source storage system configured to transfer a plurality of persistent consistency point images (PCPIs) to at least one destination storage system;
a management client operatively connected to the destination storage system and comprising a processor configured to execute a management application, the management application configured to scan a directory tree through at least one volume information block configured to reference each root of each PCPI comprising the directory tree to create an index of data structures of the at least one destination storage system, each data structure comprising a plurality of qtree versions each created at different creation times;
the management application further configured to select a first data structure to view, and, in response to the selection, query the management application, and, in response to the query, further configured to return all qtree versions created at the different creation times for the first data structure; and
a user interface of the management client configured to display on a display screen of the management client the returned qtree versions created at the different creation times, and further configured to allow a user to select a first qtree from the returned qtree versions to restore.

* * * * *

UNITED STATES PATENT AND TRADEMARK OFFICE
CERTIFICATE OF CORRECTION

PATENT NO. : 7,966,293 B1  
APPLICATION NO. : 10/796249  
DATED : June 21, 2011  
INVENTOR(S) : Shane S. Owara Page 1 of 2

It is certified that error appears in the above-identified patent and that said Letters Patent is hereby corrected as shown below:

In Col. 1, line 50 should read:
    The ~~to~~ references to the locations of the file data are provided In Col. 4, line 57 should read:
    time-separated PCPIs of the ~~to~~ volume. These can be created In Col. 6, line 19 should read:
    desirable. An approach to remote asynchronous ~~minoring~~ mirroring of a In Col. 11, lines 49-50 should read:
    mirrored to the destination volume using a qtree-based ~~minor-~~
    ~~ing~~ mirroring technique, such as that described in the above-incorpo- In Col. 12, line 65 should read:
    Hitz, September 1997, the teachings ~~Of~~ of which are expressly In Col. 15, line 16 should read:
    remote asynchronous ~~minoring~~ mirroring of a volume or sub-volume/

In Col. 19, line 19 should read:
    ~~minoring~~ mirroring application, which scans the tree for PCPI's con- In Col. 22, line 67 should read:
    job management framework configured to ~~organizes~~ organize one or In Col. 23, line 7 should read:
    scheduler of the management client configured to ~~interfaces~~ interface Signed and Sealed this  
Twentieth Day of March, 2012

David J. Kappos  
*Director of the United States Patent and Trademark Office*

CERTIFICATE OF CORRECTION (continued)
U.S. Pat. No. 7,966,293 B1

In Col. 25, line 40 should read:
        the particular qtree created at the different ~~points~~ cre- In Col. 26, lines 19-20 should read:
        of the management client configured to ~~interfaces~~ interface with the
        source storage system and ~~performs~~ perform one or more backup